United States Patent
Koorapaty et al.

(10) Patent No.: US 9,935,807 B2
(45) Date of Patent: Apr. 3, 2018

(54) DISCOVERY SIGNAL DESIGN

(71) Applicant: Telefonaktiebolaget L M Ericsson (publ), Stockholm (SE)

(72) Inventors: Havish Koorapaty, Saratoga, CA (US); George Jöngren, Sundbyberg (SE); Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 14/660,478

(22) Filed: Mar. 17, 2015

(65) Prior Publication Data

US 2016/0094374 A1    Mar. 31, 2016

Related U.S. Application Data

(60) Provisional application No. 62/056,051, filed on Sep. 26, 2014.

(51) Int. Cl.
    *H04B 7/06* (2006.01)
    *H04L 27/26* (2006.01)
    (Continued)

(52) U.S. Cl.
    CPC ........... *H04L 27/262* (2013.01); *H04W 48/16* (2013.01); *H04W 52/0216* (2013.01);
    (Continued)

(58) Field of Classification Search
    CPC ..... H04L 1/0026; H04L 1/0067; H04L 5/001; H04L 5/0023; H04L 5/0035;
    (Continued)

(56) References Cited

U.S. PATENT DOCUMENTS 8,526,385 B2 * 9/2013 Berggren ................ H04L 5/001
                                                        370/328
8,547,922 B2 * 10/2013 Yu ......................... H04L 5/0051
                                                        370/312
(Continued)

FOREIGN PATENT DOCUMENTS

WO    2014069877 A1    5/2014

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.

(Continued)

*Primary Examiner* — Eric Nowlin
(74) *Attorney, Agent, or Firm* — Withrow & Terranova, PLLC

(57) ABSTRACT

Systems and methods relating to transmitting and using multiple Channel State Information Reference Signals (CSI-RSs) for different purposes are disclosed. In some embodiments, a method of operation of a user equipment device in a cellular communications network comprises receiving multiple Zero-Power (ZP) CSI-RS configurations from the cellular communications network, the multiple ZP CSI-RS configurations comprising a first ZP CSI-RS configuration for small-cell or transmission point discovery and a second ZP CSI-RS configuration for a purpose other than small-cell or transmission point discovery, and performing one or more actions based on an assumption that, within a subframe, a set of resource elements defined by a union of all resource elements in the multiple ZP CSI-RS configurations are muted.

43 Claims, 12 Drawing Sheets

(51) Int. Cl.
*H04L 5/00* (2006.01)
*H04W 72/04* (2009.01)
*H04W 48/16* (2009.01)
*H04W 52/02* (2009.01)

(52) U.S. Cl.
CPC ..... *H04W 52/0254* (2013.01); *H04W 72/042* (2013.01); *H04W 72/0473* (2013.01); *H04B 7/0626* (2013.01); *H04L 5/005* (2013.01); *Y02B 60/50* (2013.01)

(58) Field of Classification Search
CPC ..... H04L 5/0048; H04L 5/005; H04L 5/0051; H04L 5/0053; H04L 5/0057; H04L 5/006; H04L 5/0073; H04L 27/262; H04B 7/024; H04B 7/0417; H04B 7/0456; H04B 7/0617; H04B 7/0626; H04B 7/0632; H04B 17/309; H04W 24/10; H04W 48/16; H04W 52/0216; H04W 52/0254; H04W 72/042; H04W 72/0473; H04W 72/1226
See application file for complete search history.

(56) References Cited

U.S. PATENT DOCUMENTS

| | | | | |
|---|---|---|---|---|
| 8,576,742 B2* | 11/2013 | Yoo | H04L 25/03 | 370/252 |
| 8,761,067 B2* | 6/2014 | Ren | H04W 52/04 | 370/236 |
| 8,948,076 B2* | 2/2015 | Kim | H04W 52/54 | 370/315 |
| 8,995,366 B2* | 3/2015 | Nimbalker | H04L 1/0038 | 370/329 |
| 9,008,035 B2* | 4/2015 | Qu | H04L 5/0016 | 370/330 |
| 9,088,971 B2* | 7/2015 | Anderson | H04W 72/04 | |
| 9,106,386 B2* | 8/2015 | Etemad | H04W 24/02 | |
| 9,148,818 B2* | 9/2015 | Yue | H04L 5/001 | |
| 9,204,400 B2* | 12/2015 | Xiao | H04W 52/24 | |
| 9,270,436 B2* | 2/2016 | Liu | H04W 52/143 | |
| 9,338,773 B2* | 5/2016 | Luo | H04W 72/04 | |
| 9,398,572 B2* | 7/2016 | Zhu | H04W 28/0268 | |
| 9,407,409 B2* | 8/2016 | Bhattad | H04L 1/0606 | |
| 9,491,757 B2* | 11/2016 | Wu | H04L 5/0048 | |
| 9,497,754 B2* | 11/2016 | Guo | H04W 72/04 | |
| 9,537,623 B2* | 1/2017 | Zhang | H04L 5/0032 | |
| 9,591,632 B2* | 3/2017 | Yi | H04L 5/001 | |
| 9,674,827 B2* | 6/2017 | Liu | H04L 5/0053 | |
| 9,735,941 B2* | 8/2017 | Xia | H04L 5/0053 | |
| 2010/0195599 A1* | 8/2010 | Zhang | H04L 5/0053 | 370/329 |
| 2010/0272040 A1* | 10/2010 | Nam | H04J 13/0077 | 370/329 |
| 2011/0194551 A1* | 8/2011 | Lee | H04B 7/0626 | 370/342 |
| 2011/0244877 A1* | 10/2011 | Farajidana | H04L 5/0023 | 455/452.2 |
| 2011/0286423 A1* | 11/2011 | Berggren | H04L 5/001 | 370/329 |
| 2012/0058791 A1* | 3/2012 | Bhattad | H04L 1/0606 | 455/509 |
| 2012/0087261 A1* | 4/2012 | Yoo | H04L 25/03 | 370/252 |
| 2012/0176982 A1* | 7/2012 | Zirwas | H04B 7/024 | 370/329 |
| 2012/0182946 A1* | 7/2012 | Chen | H04L 5/0032 | 370/329 |
| 2012/0201163 A1 | 8/2012 | Jöngren et al. | | |
| 2012/0213261 A1* | 8/2012 | Sayana | H04L 5/0094 | 375/224 |
| 2012/0218950 A1* | 8/2012 | Yu | H04L 5/0051 | 370/329 |
| 2012/0224559 A1* | 9/2012 | Ren | H04W 52/04 | 370/330 |
| 2012/0238310 A1* | 9/2012 | Xiao | H04W 52/24 | 455/522 |
| 2012/0282936 A1* | 11/2012 | Gao | H04L 5/0023 | 455/450 |
| 2012/0287875 A1* | 11/2012 | Kim | H04W 76/046 | 370/329 |
| 2013/0022096 A1* | 1/2013 | Kazmi | H04L 27/2602 | 375/224 |
| 2013/0039199 A1* | 2/2013 | Liao | H04B 7/0626 | 370/252 |
| 2013/0094384 A1* | 4/2013 | Park | H04L 1/0026 | 370/252 |
| 2013/0114536 A1* | 5/2013 | Yoon | H04L 25/0226 | 370/329 |
| 2013/0163535 A1* | 6/2013 | Anderson | H04W 72/04 | 370/329 |
| 2013/0201926 A1* | 8/2013 | Nam | H04L 1/1685 | 370/329 |
| 2013/0223332 A1* | 8/2013 | Wu | H04L 5/0048 | 370/315 |
| 2013/0242885 A1* | 9/2013 | Zhu | H04W 72/0413 | 370/329 |
| 2013/0242902 A1* | 9/2013 | Liu | H04W 24/10 | 370/329 |
| 2013/0250782 A1* | 9/2013 | Nimbalker | H04L 1/0038 | 370/252 |
| 2013/0301450 A1* | 11/2013 | Geirhofer | H04B 7/024 | 370/252 |
| 2013/0322376 A1* | 12/2013 | Marinier | H04W 72/06 | 370/329 |
| 2014/0016597 A1* | 1/2014 | Zhang | H04L 5/0032 | 370/329 |
| 2014/0036747 A1* | 2/2014 | Nory | H04W 72/0406 | 370/311 |
| 2014/0036796 A1* | 2/2014 | Etemad | H04W 24/02 | 370/329 |
| 2014/0126496 A1* | 5/2014 | Sayana | H04B 7/024 | 370/329 |
| 2014/0133426 A1* | 5/2014 | Liu | H04W 52/143 | 370/329 |
| 2014/0161094 A1* | 6/2014 | Ro | H04L 5/0055 | 370/329 |
| 2014/0179334 A1* | 6/2014 | Forenza | H04B 7/024 | 455/452.2 |
| 2014/0233466 A1* | 8/2014 | Pourahmadi | H04L 27/2613 | 370/329 |
| 2014/0241200 A1* | 8/2014 | Chun | H04L 5/0048 | 370/252 |
| 2014/0321399 A1* | 10/2014 | Liu | H04W 72/042 | 370/329 |
| 2014/0348077 A1* | 11/2014 | Chen | H04W 72/12 | 370/329 |
| 2015/0003269 A1* | 1/2015 | Chun | H04J 11/005 | 370/252 |
| 2015/0055614 A1* | 2/2015 | Mazzarese | H04L 5/0044 | 370/329 |
| 2015/0201386 A1* | 7/2015 | Kimura | H04W 52/245 | 455/522 |
| 2015/0223210 A1* | 8/2015 | Guo | H04W 72/04 | 370/329 |
| 2015/0256312 A1* | 9/2015 | Yi | H04W 72/04 | 370/329 |
| 2015/0282036 A1* | 10/2015 | Yi | H04L 5/001 | 370/332 |
| 2015/0304009 A1* | 10/2015 | Kang | H04B 7/022 | 370/329 |
| 2015/0304995 A1* | 10/2015 | Yi | H04L 5/001 | 370/329 |
| 2015/0319777 A1* | 11/2015 | Seo | H04W 74/002 | 370/330 |
| 2015/0365154 A1* | 12/2015 | Davydov | H04B 7/024 | 370/329 |
| 2015/0365178 A1* | 12/2015 | Maattanen | H04B 17/345 | 370/329 |

(56) References Cited

U.S. PATENT DOCUMENTS

| | | | |
|---|---|---|---|
| 2016/0192227 A1* | 6/2016 | Gong | H04L 5/005 370/252 |
| 2016/0255648 A1* | 9/2016 | Frenne | H04L 5/0048 370/329 |
| 2016/0278032 A1* | 9/2016 | Yi | H04W 16/32 |
| 2016/0294514 A1* | 10/2016 | Tang | H04W 36/0066 |
| 2016/0301493 A1* | 10/2016 | Cao | H04J 11/0079 |
| 2017/0070271 A1* | 3/2017 | Lee | H04B 7/0413 |
| 2017/0079047 A1* | 3/2017 | Lee | H04B 7/0413 |

OTHER PUBLICATIONS

Huawei, et al., "R1-143499: Remaining aspects for small cell discovery signal design," 3rd Generation Partnership Project (3GPP), TSG RAN WG1 #78, Agenda item 7.2.1.2.2, Aug. 18-22, 2014, 6 pages, Dresden, Germany.

Huawei, "R1-144473: Summary of Offline Discussions on Small Cell Discovery Signal," 3rd Generation Partnership Project (3GPP), TSG RAN WG1 #78bis, Agenda item 7.2, Oct. 6-10, 2014, 10 pages, Ljubljana, Slovenia.

LG Electronics, "R1-143169: Remaining issues on DRS design details," 3rd Generation Partnership Project (3GPP), TSG RAN WG1 Meeting #78, Agenda item 7.2.1.2.2, Aug. 18-22, 2014, 4 pages, Dresden, Germany.

LG Electronics, "R1-143170: DRS-based measurement procedures with network assistance," 3rd Generation Partnership Project (3GPP), TSG RAN WG1 Meeting #78, Agenda Item 7.2.1.2.3, Aug. 18-22, 2014, 7 pages, Dresden, Germany.

Nokia Networks, et al., "R1-143243: On detailed design of Discovery Signals," 3rd Generation Partnership Project (3GPP), TSG-RAN WG1 Meeting #78, Aug. 18-22, 2014, 5 pages, Dresden, Germany.

International Search Report and Written Opinion for International Patent Application No. PCT/IB2015/057341, dated Jan. 22, 2016, 20 pages.

* cited by examiner

DISCOVERY SIGNAL DESIGN

RELATED APPLICATIONS

This application claims the benefit of provisional patent application Ser. No. 62/056,051, filed Sep. 26, 2014, the disclosure of which is hereby incorporated herein by reference in its entirety.

TECHNICAL FIELD

Embodiments of the disclosure relate to the field of wireless communication and more specifically to discovery signal design in a wireless communications system.

BACKGROUND

3$^{rd}$ Generation Partnership Project (3GPP) Long Term Evolution (LTE) technology is a mobile broadband wireless communication technology in which transmissions from base stations (referred to as enhanced or evolved Node Bs (eNBs)) to mobile stations (e.g., User Equipment devices (UEs)) are sent using Orthogonal Frequency Division Multiplexing (OFDM). OFDM splits the signal into multiple parallel sub-carriers in frequency. The basic unit of transmission in LTE is the Resource Block (RB), which in its most common configuration consists of 12 subcarriers in frequency and 7 OFDM symbols in time (one slot). A unit of one subcarrier and 1 OFDM symbol is referred to as a Resource Element (RE), as shown in FIG. 1. Thus, an RB consists of 84 REs.

An LTE radio subframe is composed of two slots in time and multiple RBs in frequency with the number of RBs determining the bandwidth of the system, as illustrated in FIG. 2. Furthermore, the two RBs in a subframe that are adjacent in time are denoted as an RB pair. Currently, LTE supports standard bandwidth sizes of 6, 15, 25, 50, 75, and 100 RB pairs. In the time domain, LTE downlink transmissions are organized into radio frames of 10 milliseconds (ms), each radio frame consisting of ten equally-sized subframes of length $T_{subframe}=1$ ms.

The signal transmitted by the eNB in a downlink (the link carrying transmissions from the eNB to the UE) subframe may be transmitted from multiple antennas, and the signal may be received at a UE that has multiple antennas. The radio channel distorts the transmitted signals from the multiple antenna ports. In order to demodulate any transmissions on the downlink, a UE relies on Reference Symbols (RS) that are transmitted on the downlink. In addition, reference signals can be used to measure the channel between the transmitter and the receiver antenna. Therefore, Antenna Ports (AP) are introduced in the LTE specifications. Each RS is associated with an AP, and when the UE is measuring the channel using the RS, it is said that the UE is measuring the channel from the stated AP (to the receiver antenna). It should be noted that it is up to transmitter implementation to determine how to transmit the RS in case there are multiple physical antennas at the transmitter side used to transmit the RS for a single port. The mapping of a RS to multiple physical antennas is called antenna virtualization and this operation is transparent to the UE since the UE can only measure the channel on the given RS, i.e. the AP.

The RSs and their position in the time-frequency grid are known to the UE and hence can be used to synchronize to the downlink signal and determine channel estimates by measuring the effect of the radio channel on these symbols.

In Release 11 and prior releases of LTE, there are multiple types of RSs. The Common Reference Signals (CRSs), corresponding to AP 0-3, are used for channel estimation during demodulation of control and data messages in addition to synchronization. The CRSs are present in every subframe. The Channel State Information Reference Signals (CSI-RSs, AP 15-22) are also used for channel state feedback related to the use of transmission modes that enable UE-specific antenna precoding. These transmission modes use the UE-specific Demodulation Reference Symbols (DM-RSs, AP 7-14) at the time of transmission with the precoding at the eNB performed based on the feedback received from and measured by the UE on the CSI-RSs. The Primary Synchronization Signal (PSS) and the Secondary Synchronization Signal (SSS) are used for cell search and coarse time and frequency synchronization. These signals are strictly not reference signals but synchronization signals and hence do not correspond to any numbered AP in the LTE specifications. All of these reference signals are shown in FIG. 3 over two subframes of duration 1 ms each.

The CSI-RSs are modulated using a sequence that depends on a configurable cell Identifier (ID) that can be different from the cell ID being used in the cell. The CSI-RS utilizes an orthogonal cover code of length two to overlay two APs on two consecutive REs. As shown in FIG. 3, many different CSI-RS patterns are available. For the case of two CSI-RS APs, there are 20 different patterns within a subframe. The corresponding number of patterns is 10 and 5 for 4 and 8 CSI-RS APs, respectively. For Time Division Duplexing (TDD), some additional CSI-RS patterns are available.

The CSI-RS can be configured for a UE as Non-Zero-Power (NZP) and Zero-Power (ZP) instances. The NZP CSI-RS configuration indicates the REs where the cell being measured transmits CSI-RS and the ZP CSI-RS configuration indicates the REs where no information is transmitted by the cell being measured. The ZP CSI-RS REs are typically configured so that they overlap with transmissions from other cells which allows the UE to make interference measurements or Reference Signal Received Power (RSRP) measurements on the CSI-RS of other cells. Knowledge of the ZP CSI-RS configurations also allows the UE to not use these REs, i.e., rate-match around these REs when receiving the Physical Downlink Shared Channel (PDSCH).

The PSS and SSS define the cell ID of the cell. The SSS can take 168 different values representing different cell ID groups. The PSS can take three different values that determine the cell ID within a group. Thus, there are a total of 504 cell IDs. FIG. 4 illustrates reference signals in Frequency Division Duplexing (FDD) and TDD carriers.

Dense deployments of small cells are attractive to increase system capacity. However, dense deployments typically have fewer UEs connected to each cell and lower resource utilization with higher rates provided when the cells are used. Reference signal structures that are developed for regular deployments with existing systems such as 3GPP LTE may have too high of a density so that there is a substantial amount of unnecessary interference created when deployments become dense. Reference signals may be transmitted even when there is no data being sent to the UEs.

In order to tackle this problem of unnecessary interference, solutions to turn small cells off when they are not being used are being introduced in 3GPP LTE Release 12. However, to ensure that cells can be ready to deliver data to and receive data from UEs with minimal delay, it is necessary for UEs to make some essential measurements on cells even when they are off. In order to facilitate this, a set of reference signals that are sent with much lower density in time have been introduced. Such signals are referred to as discovery signals and procedures associated with them are referred to as discovery procedures.

More specifically, in LTE Release 12 small cell on/off where the eNB can be off for long periods of time, a discovery signal can be configured in order to assist the UE with the measurements. The discovery signal supports the properties required for enabling Radio Resource Management (RRM) measurements (e.g., received power and quality measurements (referred to as RSRP and Reference Signal Received Quality (RSRQ) measurements in LTE)) and time/frequency synchronization. The discovery signals are sent in a Discovery Reference Signal (DRS) occasion that can have a duration from 1 to 5 subframes for FDD and 2 to 5 subframes for TDD. The DRS occasions can occur once every 40, 80, or 160 ms. The UE is configured with a Discovery Measurement Timing Configuration (DMTC) for each carrier frequency on which RRM measurements for cells needs to be performed. The DMTC duration is 6 ms and the timing of the DMTC is signaled to the UE in reference to the current serving cell.

Within one cell, there may be multiple transmission points from which the downlink signal can transmitted. The transmission points may be geographically separated within the cell and/or correspond to antennas with significantly different coverage areas. Examples of this are a distributed antenna system that transmits signals that all belong to the same cell (i.e., the same cell ID), where multiple radio remote heads are physically dislocated within the cell. The term transmission point may also refer to a sector of a site where the different sectors of the same site then constitute different transmission points. The discovery signal is capable of identifying individual transmission points and enabling RRM measurements for them via the use of different CSI-RS configurations at different transmission points.

In LTE, the CSI-RSs can be assigned to different transmission points within a cell to identify them. The CSI-RSs are part of the discovery signal being introduced in Release 12 and simple RSRP measurements on the CSI-RSs are being defined. The CSI-RSs have a high degree of configurability and are designed to be used for CSI measurements by the UE. However, due to the high degree of configurability, the UE needs to be provided assistance information by the network about the precise configuration that the UE should use for measurements.

The NZP and ZP CSI-RS configurations that are part of the discovery signal are configured semi-statically via higher layer Radio Resource Control (RRC) signaling as part of the discovery signal configuration. The discovery signal configuration also indicates the periodicity of the discovery occasions which may occur once every 40, 80, or 160 ms. These discovery occasions may last up to 5 subframes in duration on each occasion. The UE may also be configured with NZP and ZP CSI-RS configurations for CSI feedback independently from the discovery signal configuration. These CSI-RSs can occur as often as once every 5 ms.

If the CSI-RSs are configured separately for CSI feedback and for discovery signal based RRM measurements and they provide different information on which REs are configured to be ZP and NZP, it may create a problem for the UE. In particular, the UE does not know how to process the subframe when receiving PDSCH and use the CSI-RS for feedback or measurements.

Existing solutions as discussed in LTE Release 12 rely on the eNB using different CSI-RS configurations for the discovery signal subframes and for other subframes where CSI-RSs are configured for CSI feedback. If subframes with CSI feedback do overlap with the discovery signal subframes, existing solutions rely on the CSI-RS configurations being the same between them so that there is no conflict. This creates restrictions for how the CSI-RSs can be configured for regular CSI feedback, which is undesirable.

SUMMARY

Systems and methods relating to transmitting and using multiple Channel State Information Reference Signals (CSI-RSs) for different purposes are disclosed. In some embodiments, a method of operation of a user equipment device (UE) in a cellular communications network comprises receiving multiple Zero-Power (ZP) CSI-RS configurations from the cellular communications network, the multiple ZP CSI-RS configurations comprising a first ZP CSI-RS configuration for small-cell or transmission point discovery and a second ZP CSI-RS configuration for a purpose other than small-cell or transmission point discovery, and performing one or more actions based on an assumption that, within a subframe, a set of Resource Elements (REs) defined by a union of all REs in the multiple ZP CSI-RS configurations are muted.

In some embodiments, performing the one or more actions comprises receiving data transmitted by a base station of the cellular communications network based on rate matching around the set of REs defined by the union of all REs in the multiple ZP CSI-RS configurations.

In some embodiments, performing the one or more actions comprises receiving a Physical Downlink Shared Channel (PDSCH) transmitted by a base station of the cellular communications network based on rate matching of the PDSCH around the set of REs defined by the union of all REs in the multiple ZP CSI-RS configurations.

In some embodiments, the method of operation of the UE further comprises receiving a Non-Zero Power (NZP) CSI-RS configuration that overlaps at least one of the multiple ZP CSI-RS configurations, and using REs in the NZP CSI-RS configuration for an intended purpose of the NZP CSI-RS configuration. Performing the one or more actions comprises receiving a PDSCH transmitted by a base station of the cellular communications network based on rate matching of the PDSCH around the set of REs defined by the union of all REs in the multiple ZP CSI-RS configurations including one or more of the REs in the NZP CSI-RS configuration that overlap with the at least one of the multiple ZP CSI-RS configurations. In some embodiments, the intended purpose of the NZP CSI-RS configuration is CSI feedback.

In some embodiments, the purpose other than small-cell or transmission point discovery is CSI feedback.

In some embodiments, the method of operation of the UE further comprises separately using each ZP CSI-RS configuration of the multiple ZP CSI-RS configurations for an intended purpose of the ZP CSI-RS configuration.

Embodiments of a UE are also disclosed.

In some embodiments, a method of operation of a base station of a cellular communications network comprises transmitting multiple ZP CSI-RS configurations to a UE, the multiple ZP CSI-RS configurations comprising a first ZP CSI-RS configuration for small-cell or transmission point discovery and a second ZP CSI-RS configuration for a purpose other than small-cell or transmission point discovery, and transmitting, in a subframe, data to the UE based on rate matching around a set of REs defined by a union of all REs in the multiple ZP CSI-RS configurations for the UE.

In some embodiments, transmitting the data comprises transmitting a PDSCH to the UE in a subframe based on rate matching of the PDSCH around the set of REs defined by the union of all REs in the multiple ZP CSI-RS configurations.

In some embodiments, the method of operation of the base station comprises transmitting a NZP CSI-RS configuration to the UE that overlaps at least one of the multiple ZP CSI-RS configurations. Transmitting the data comprises transmitting a PDSCH to the UE in a subframe based on rate matching of the PDSCH around the set of REs defined by the union of all REs in the multiple ZP CSI-RS configurations including one or more of the REs in the NZP CSI-RS configuration that overlap with the at least one of the multiple ZP CSI-RS configurations. In some embodiments, the intended purpose of the NZP CSI-RS configuration is CSI feedback.

In some embodiments, the purpose other than small-cell or transmission point discovery is CSI feedback.

Embodiments of a base station are also disclosed.

In some embodiments, a method of operation of a UE in a cellular communications network comprises receiving multiple ZP CSI-RS configurations from the cellular communications network, the multiple ZP CSI-RS configurations comprising a first ZP CSI-RS configuration for small-cell or transmission point discovery and a second ZP CSI-RS configuration for a purpose other than small-cell or transmission point discovery, and performing one or more actions based on an assumption that, within a subframe, a set of REs in one of the multiple ZP CSI-RS configurations are muted, the set of REs in the one of the multiple ZP CSI-RS configurations being inclusive of all REs in the other ZP CSI-RS configurations.

In some embodiments, performing the one or more actions comprises receiving a PDSCH transmitted by a base station of the cellular communications network based on rate matching of the PDSCH around the set of REs in the one of the multiple ZP CSI-RS configurations.

In some embodiments, receiving the multiple ZP CSI-RS configurations comprises receiving the one of the multiple CSI-RS configurations via dynamic signaling and receiving another one of the multiple CSI-RS configurations via semi-static signaling, and performing the one or more actions comprises performing the one or more actions based on an assumption that the one of the multiple ZP CSI-RS configurations received via dynamic signaling takes precedence over the other ZP CSI-RS configurations such that the set of REs in the one of the multiple ZP CSI-RS configurations are muted and are inclusive of all REs in the other ZP CSI-RS configurations. In some embodiments, performing the one or more actions comprises receiving a PDSCH transmitted by a base station of the cellular communications network based on rate matching of the PDSCH around the set of REs in the one of the multiple ZP CSI-RS configurations.

In some embodiments, a method of operation of a base station of a cellular communications network comprises transmitting multiple ZP CSI-RS configurations to a UE such that a set of a set of REs in the one of the multiple ZP CSI-RS configurations is inclusive of all REs in the other ZP CSI-RS configurations, the multiple ZP CSI-RS configurations comprising a first ZP CSI-RS configuration for small-cell or transmission point discovery and a second ZP CSI-RS configuration for a purpose other than small-cell or transmission point discovery, and transmitting, within a subframe, data to the UE based on rate matching around the set of REs in the one of the multiple ZP CSI-RS configurations that is inclusive of all REs in the other ZP CSI-RS configurations.

In some embodiments, transmitting the data comprises transmitting, within the subframe, a PDSCH based on rate matching of the PDSCH around the set of REs in the one of the multiple ZP CSI-RS configurations.

In some embodiments, transmitting the multiple ZP CSI-RS configurations comprises transmitting the one of the multiple CSI-RS configurations via dynamic signaling and transmitting another one of the multiple CSI-RS configurations via semi-static signaling. Further, in some embodiments, transmitting the data comprises transmitting, within the subframe, a PDSCH based on rate matching of the PDSCH around the set of REs in the one of the multiple ZP CSI-RS configurations.

In some embodiments, a method of operation of a UE comprises receiving a first NZP CSI-RS configuration for a first purpose and a second NZP CSI-RS configuration for a second purpose, the first and second NZP CSI-RS configurations comprising an aligned RE that is comprised in both the first and second NZP CSI-RS configurations, and using the aligned RE for both the first and second purposes.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
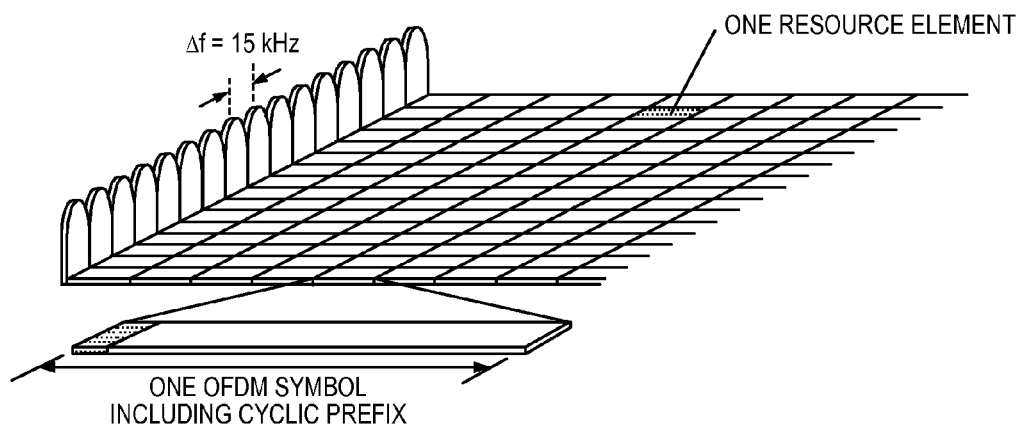
FIG. 1 illustrates a Resource Element (RE) in a Long Term Evolution (LTE) Resource Block (RB)
Figure 2:
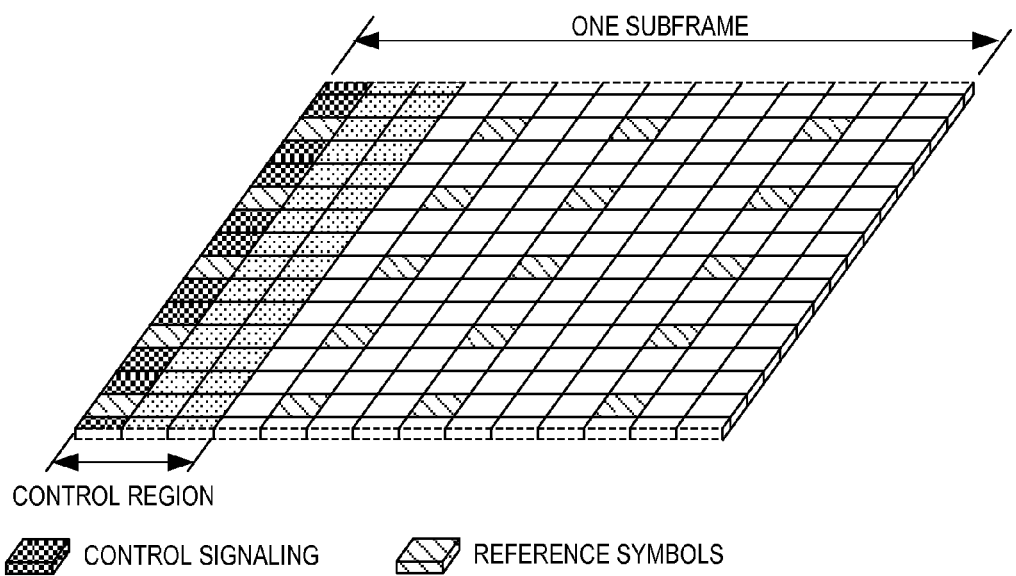
FIG. 2 illustrates an LTE radio subframe.
Figure 3:
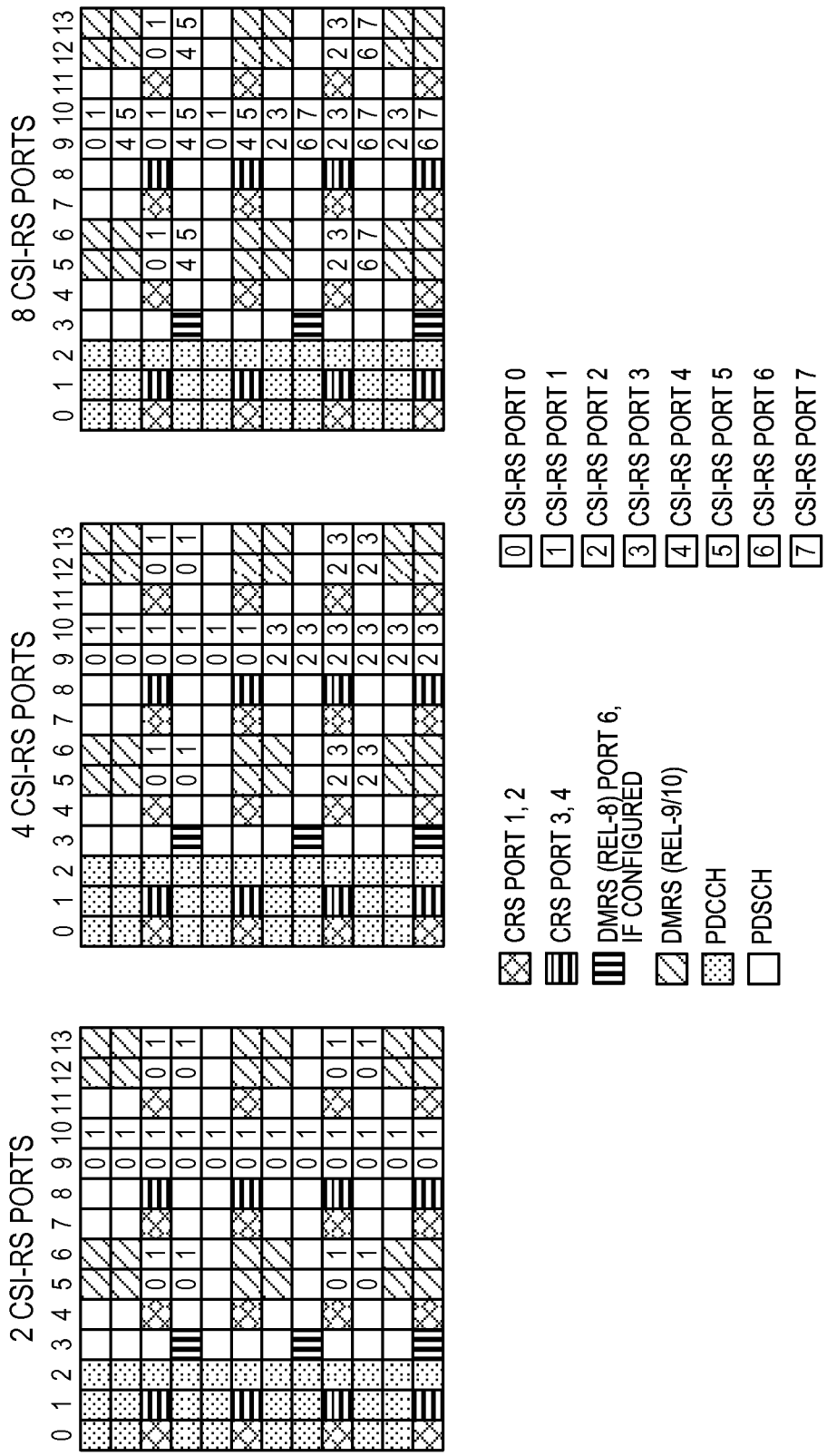
FIG. 3 illustrates a RE grid over an RB pair showing potential positions for LTE Release 9/10 User Equipment (UE) specific Reference Symbols (RSs), Channel State Information Reference Symbols (CSI-RSs), and Common Reference Symbols (CRSs)
Figure 4:
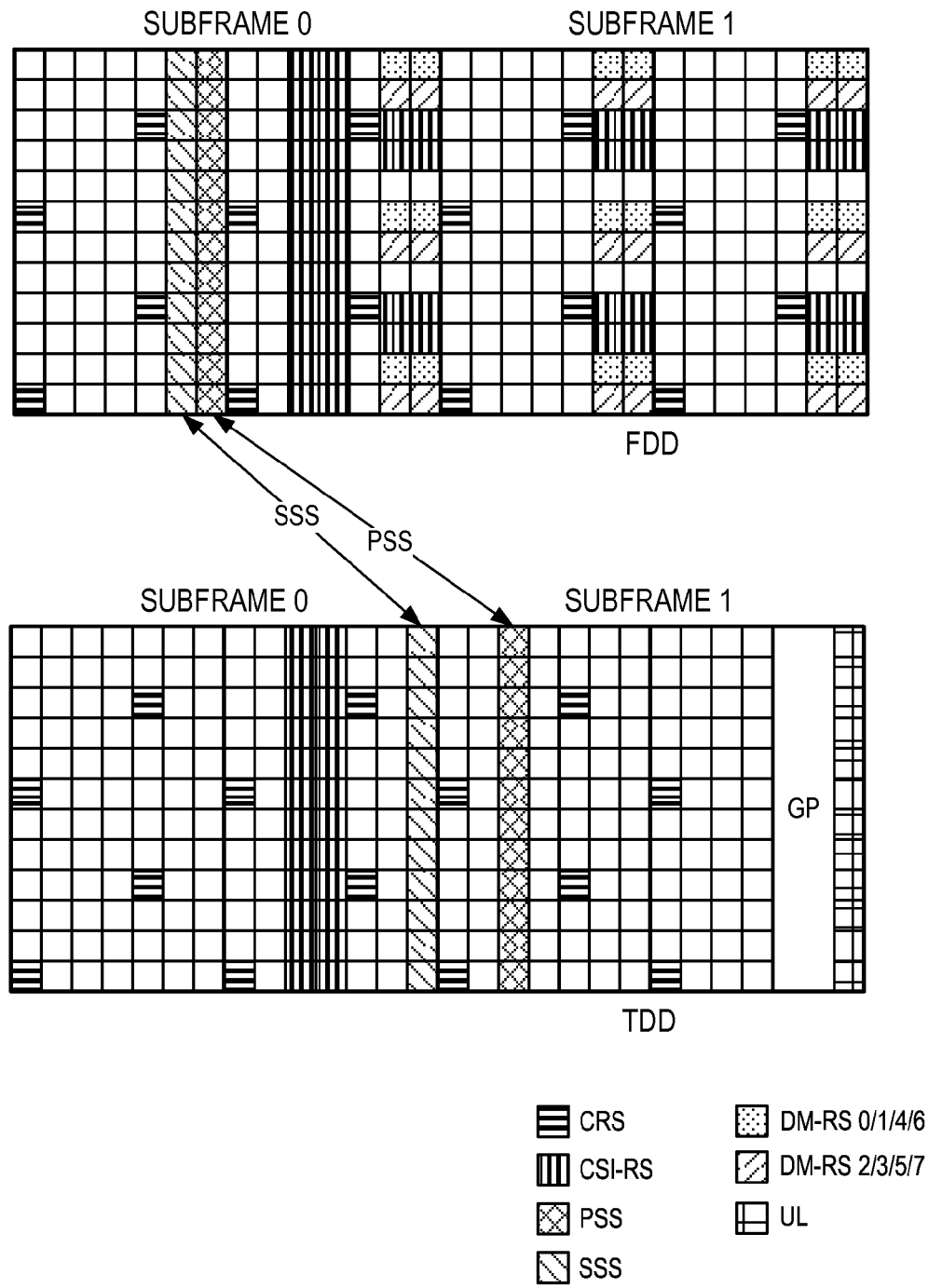
FIG. 4 illustrates reference signals in Frequency Division Duplexing (FDD) and Time Division Duplexing (TDD) LTE carriers.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the disclosure may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical, or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more buses and bridges (also termed as bus controllers). Thus, a non-transitory machine-readable medium of a given electronic device typically stores instructions for execution on one or more processors of that electronic device. One or more parts of an embodiment of the disclosure may be implemented using different combinations of software, firmware, and/or hardware.

The following commonly terminologies are used in the embodiments and are elaborated below:

Network node: In some embodiments, a more general term "network node" is used and it can correspond to any type of radio network node or any network node, which communicates with a UE and/or with another network node. Examples of network nodes are a Node B, a base station, a Multi-Standard Radio (MSR) radio node such as a MSR base station, an enhanced or evolved Node B (eNB), a network controller, a Radio Network Controller (RNC), a base station controller, a relay, a donor node controlling relay, a base transceiver station, an Access Point (AP), transmission points, transmission nodes, a Remote Radio Unit (RRU), a Remote Radio Head (RRH), nodes in a Distributed Antenna System (DAS), a core network node (e.g., a Mobile Switching Centre (MSC), a Mobility Management Entity (MME), etc.), an Operation and Management (O&M) node, an Operations and Support System (OSS), a Self-Organizing Network (SON), a positioning node (e.g., Evolved Serving Mobile Location Centre (E-SMLC)), Minimization of Drive Tests (MDT), etc.

User equipment: In some embodiments, the non-limiting term User Equipment (UE) is used and refers to any type of wireless device communicating with a network node and/or with another UE in a cellular or mobile communications system. Examples of a UE are a target device, a Device-to-Device (D2D) UE, a machine type UE or a UE capable of Machine-to-Machine (M2M) communication, a Personal Digital Assistant (PDA), an iPAD, a tablet, mobile terminals, a smart phone, Laptop Embedded Equipment (LEE), Laptop Mounted Equipment (LME), Universal Serial Bus (USB) dongles, etc.

Figure 5:
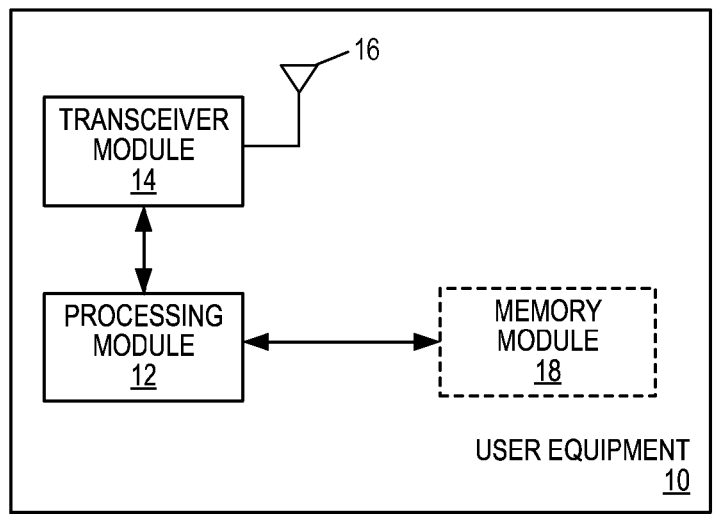
FIG. 5 is a block diagram of a UE according to some embodiments of the present disclosure.

FIG. 5 is a block diagram of a UE 10 (e.g., a mobile device), according to one exemplary embodiment, that can be used in one or more of the non-limiting example embodiments described. The UE 10 may in some embodiments be a mobile device that is configured for M2M or Machine-Type Communication (MTC). The UE 10 comprises a processing module 12 that controls the operation of the UE 10. As will be appreciated by one of ordinary skill in the art, the processing module 12 includes one or more processors, or processor circuits (e.g., one or more Central Processing Unit(s) (CPU(s)), Application Specific Integrated Circuit(s) (ASIC(s)), and/or Field Programmable Gate Array(s) (FPGA(s))). The processing module 12 is connected to a receiver or transceiver module 14 with associated antenna(s) 16 which are used to receive signals from or both transmit signals to and receive signals from a base station (e.g., an eNB as discussed below) in a cellular communications network. To make use of Discontinuous Reception (DRX), the processing module 12 can be configured to deactivate the receiver or transceiver module 14 for specified lengths of time. The UE 10 optionally comprises a memory module 18 that is connected to the processing module 12 and that stores program and other information and data required for the operation of the UE 10. In some embodiments, the UE 10 may optionally comprise a satellite positioning system (e.g., a Global Positioning System (GPS)) receiver module (not shown) that can be used to determine the position and speed of movement of the UE 10.

Figure 6:
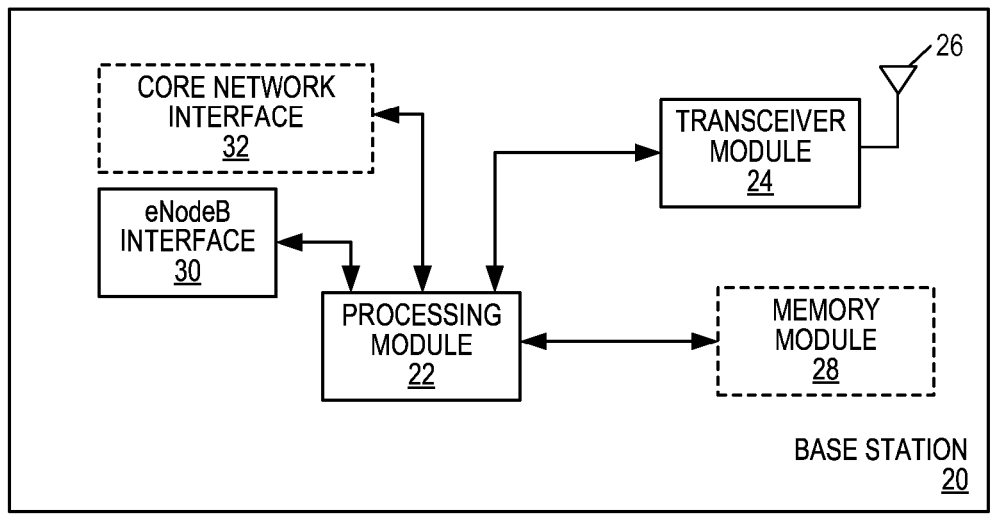
FIG. 6 is a block diagram of a base station (e.g., an enhanced or evolved Node B (eNB)) according to some embodiments of the present disclosure.

FIG. 6 shows a base station 20 (for example a Node B or an eNB) that can be used in example embodiments described. It will be appreciated that although a macro eNB will not in practice be identical in size and structure to a micro eNB, for the purposes of illustration, base stations 20 are assumed to include similar components. Thus, the base station 20 comprises a processing module 22 that controls the operation of the base station 20. As will be appreciated by one of ordinary skill in the art, the processing module 22 includes one or more processors, or processor circuits (e.g., one or more CPU(s), ASIC(s), and/or FPGA(s)). The processing module 22 is connected to a transceiver module 24 with associated antenna(s) 26 which are used to transmit signals to, and receive signals from, UEs 10 in the cellular communications network. The base station 20 optionally comprises a memory module 28 that is connected to the processing module 22 and that stores program and other information and data required for the operation of the base station 20. The base station 20 also includes components and/or circuitry 30 for allowing the base station 20 to exchange information with other base stations 20 (for example via an X2 interface) and, optionally, components and/or circuitry 32 for allowing the base station 20 to exchange information with nodes in a core network of the cellular communications network (for example via the S1 interface). It will be appreciated that base stations for use in other types of networks (e.g., a Universal Terrestrial Radio Access Network (UTRAN) or a Wideband Code Division Multiple Access (WCDMA) Radio Access Network (RAN)) will include similar components to those shown in FIG. 6 and appropriate interface circuitry 30, 32 for enabling communications with the other network nodes in those types of networks (e.g., other base stations, mobility management nodes, and/or nodes in the core network).

A problem that needs addressing in 3$^{rd}$ Generation Partnership Project (3GPP) Long Term Evolution (LTE) Release 12 regarding the interpretation of Zero-Power (ZP) Channel State Information Reference Signal (CSI-RS) configurations indicated to the UE 10 is the following. Measurements based on the newly defined discovery signals can be based on CSI-RS present within the discovery signal occasions. This is particularly useful in shared cell scenarios where multiple transmission points (e.g., a macro base station, RRHs, sectors of a cell, etc.) within a cell transmit the same Primary Synchronization Signal (PSS)/Secondary Synchronization Signal (SSS)/Common Reference Signal (CRS) but different CSI-RS. In order to create orthogonality between the different transmission points or cells, the ability to configure the UE 10 with up to five ZP CSI-RS configurations was defined along with Non-Zero-Power (NZP) CSI-RS assigned to each transmission point or cell. Each ZP configuration can flexibly indicate from four up to 40 Resource Elements (REs) as being muted. Knowledge of these ZP configurations can also be used for rate-matching during Physical Downlink Shared Channel (PDSCH) reception in a subframe carrying discovery signals.

However, the same CSI-RS NZP and ZP configurations can also be used to facilitate CSI and interference measurements and for rate matching during PDSCH reception in other subframes. For transmission modes 1-9, a single ZP configuration can be defined for the UE 10 via higher layer signaling. For transmission mode 10, up to four ZP configurations may be defined which can then be dynamically chosen from using the PDSCH RE Mapping and Quasi-co-location Indicator field in Downlink Control Information (DCI) format 2D. Conventionally, it is unclear which ZP CSI-RS configurations the UE 10 should use for rate-matching when the CSI-RS configured for CSI measurements occur in a subframe carrying discovery signals.

In this disclosure, this ambiguity is avoided as follows: according to one embodiment, the UE 10 assumes that a union of all the REs that are defined in each of the multiple CSI-RS ZP configurations are muted. The NZP CSI-RS can be independently processed as per each configuration and in subframes where the two NZP configurations align, the same CSI-RS signal can be used by the UE 10 for multiple purposes. Such explicit specification will ensure that UE 10 behavior is not ambiguous while providing the network maximum flexibility in using discovery signals on a serving cell for which CSI feedback is configured. These aspects of the disclosure may be further illustrated using the example in FIG. 7.

Figure 7:
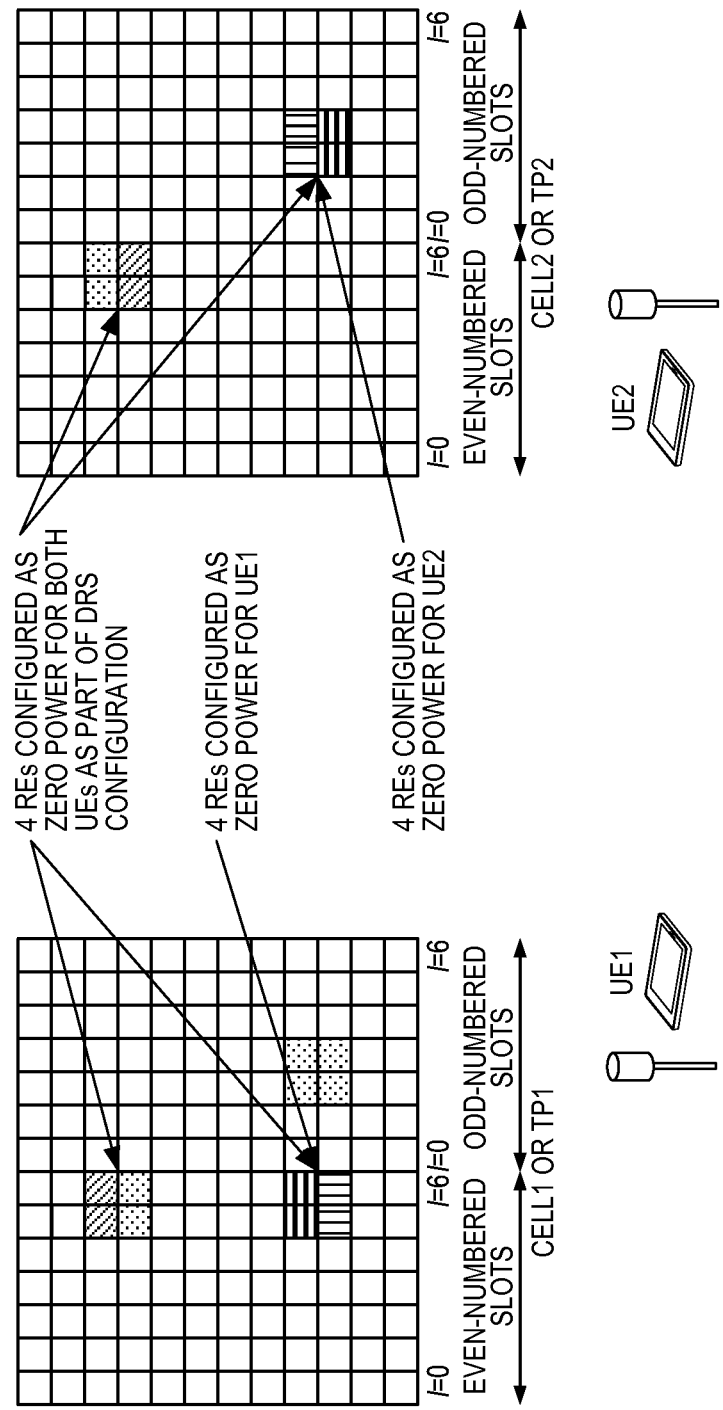
FIG. 7 illustrates Zero-Power (ZP) CSI-RS and Non-Zero-Power (NZP) CSI-RS configurations for discovery signals and legacy CSI and interference measurements.

FIG. 7 shows a single representative Resource Block (RB) from two cells or transmission points and shows two UEs 10 in the system, with each UE 10 associated with one transmission point or cell. A set of eight REs are shown as being configured with ZP and NZP CSI-RS for the purpose of discovery signals. Here, a set or region of CSI-RS REs is configured as being ZP CSI-RS for both the cells or transmission points. Within the overall ZP CSI-RS region, one cell has NZP CSI-RS configured in a pair of REs while the other cell has NZP CSI-RS configured in another pair of REs. When a UE 10 receives such a NZP CSI-RS configuration overlapping with a ZP configuration, it can assume the REs that are part of the NZP CSI-RS configuration are being used to transmit a CSI-RS signal that can be used for the configured purpose, e.g., CSI feedback. However, for PDSCH reception, all the REs that are part of the ZP configuration, including the NZP REs contained in it, are assumed to be muted for the purpose of PDSCH reception. Such a configuration of ZP and NZP CSI-RS ensures that the NZP CSI-RS from both cells or transmission points are orthogonal when the cells or transmission points are synchronous and aligned in time and frequency. When a UE 10 receives PDSCH (data) transmissions, it assumes that no data symbols are transmitted in the set of all eight REs shown in FIG. 7 that have been declared as being ZP for the purpose of discovery signal measurements, and hence performs rate matching around these REs.

FIG. 7 also shows a different set or region of four REs that are configured as ZP CSI-RS, for example, for the purpose of interference measurements to assist with Channel Quality Indication (CQI) feedback. This region could be different for the different cells and it may or may not overlap with the CSI-RS ZP regions defined for discovery signals. FIG. 7 shows that UE1 connected to Cell1 or TP1 is configured with ZP CSI-RS in one region that is separate from the discovery signal ZP CSI-RS region while UE2 connected to Cell2 or TP2 is configured with ZP CSI-RS in a different region in the subframe which overlaps with the discovery signal region.

According to embodiments described herein, when a UE 10 receives a PDSCH transmission from a cell or transmission point, it assumes that the REs muted via ZP CSI-RS configurations are the set of REs that is the union of the RE sets configured as being ZP for the purposes of discovery signal measurements and for other legacy purposes. Therefore, in FIG. 7, UE1 connected to Cell1 or TP1 assumes a total of 12 REs as being configured with ZP in which no PDSCH symbols are received. The 12 REs are from the two separate sets or regions of ZP REs for discovery signals and for other legacy purposes such as interference measurements. UE2 connected to Cell2 or TP2 on the other hand assumes that a total of eight REs are configured with ZP and thus not carrying any PDSCH symbols when PDSCH is received. This is because the ZP CSI-RS configured for legacy purposes and for the discovery signal are overlapping. Therefore, using the union set of the multiple CSI-RS ZP sets allows the UE 10 to make the right assumptions for rate matching regardless of overlapping or non-overlapping CSI-RS ZP configurations. This further allows the eNB flexibility in assigning ZP CSI-RS configurations to UEs 10.

In another embodiment, the eNB ensures that one of the configurations, e.g., the one assigned to a UE 10 for CSI feedback and interference measurements, fully includes the ZP CSI-RS from the other configurations, and the UE 10 explicitly assumes that the configuration for a certain purpose takes precedence.

In another embodiment, the UE 10 assumes that dynamically signaling, e.g., as in DCI format 2D, that indicates a certain ZP CSI-RS configuration always takes precedence over any conflicting configurations that are defined semi-statically via higher layer signaling. The eNB then ensures that one of the parameter sets that can be signaled dynamically includes a CSI-RS ZP configuration that includes all the necessary ZP REs in a subframe where CSI-RS configurations for different purposes overlap.

Furthermore, in an alternative embodiment, for Cell2 or TP2 shown in FIG. 7, a NZP CSI-RS may be configured for legacy purposes such as CSI feedback in the ZP region shown that is fully aligned (it is the same signal) with the NZP CSI-RS configured for the discovery signal from this cell or transmission point. In this case, the same NZP CSI-RS signal (e.g., the horizontally striped REs in Cell2 or TP2) could be used both for discovery signal based measurements as well as for CSI feedback. Discovery signal based measurements may be carried out by UEs that are not connected to this cell but are making neighboring cell measurements while CSI feedback is carried out only by UEs connected to the cell.

The following are various exemplary embodiments within the scope of the present disclosure. These following embodiments are provided for exemplary purposes only, and one of ordinary skill would realize that various other features may be present within the scope of the disclosure.

Exemplary Embodiment 1

In a subframe where the UE 10 is configured with ZP CSI-RS for discovery signals as well as with LTE Release 10/11/12 ZP CSI-RS for purposes other than the discovery signal, the UE 10 assumes that the set of muted REs is a union of the sets of REs defined as being ZP in each of the configurations.

Exemplary Embodiment 2

An eNB may assign LTE Release 10/11/12 ZP CSI-RS configurations for purposes other than the discovery signal as well as ZP CSI-RS for discovery signals so that the set of REs for the two configurations may overlap.

Exemplary Embodiment 3

An eNB may assign LTE Release 10/11/12 NZP CSI-RS configurations for purposes other than the discovery signal as well as NZP CSI-RS configurations for LTE Release 12 discovery signals that align in certain subframes so that the same transmitted signal can be used by the UE 10 for multiple purposes in those subframes.

Exemplary Embodiment 4

An eNB ensures that one of the ZP CSI-RS configurations for a first purpose, e.g., the one assigned to a UE 10 for CSI feedback and interference measurements, fully includes the ZP CSI-RS from the other configurations for other purposes and the UE 10 explicitly assumes that the configuration for the first purpose takes precedence.

Exemplary Embodiment 5

The UE 10 assumes that dynamically signaling, e.g., as in DCI format 2D, that indicates a certain ZP CSI-RS configuration always takes precedence over any conflicting configurations that are defined semi-statically via higher layer signaling. The eNB ensures that one of the parameter sets that can be signaled dynamically includes a CSI-RS ZP configuration that includes all the necessary ZP REs in a subframe where CSI-RS configurations for different purposes overlap.

Figure 8:
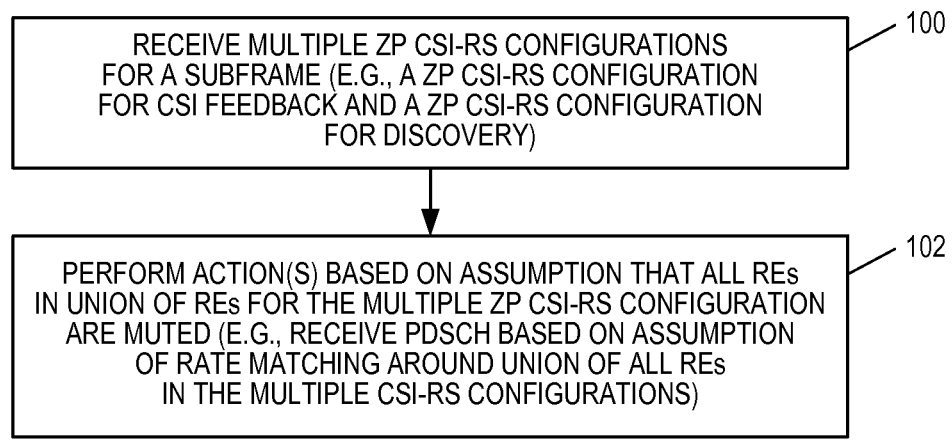
FIG. 8 is a flow chart that illustrates the operation of a UE to perform one or more actions based on a ZP CSI-RS configuration and one or more additional ZP CSI-RS configurations for the same subframe according to some embodiments of the present disclosure.

FIGS. 8 through 12 illustrate embodiments described above. In particular, FIG. 8 is a flow chart that illustrates the operation of the UE 10 according to some embodiments of the present disclosure. As illustrated, the UE 10 receives multiple ZP CSI-RS configurations for a subframe (step 100). Notably, some of these ZP CSI-RS configurations may be semi-static configurations that are applicable to multiple subframes (e.g., a ZP CSI-RS configuration via Radio Resource Control (RRC) signaling) and others may be dynamic configurations that are applicable to a single subframe (e.g., a ZP CSI-RS configuration via a DCI message). The ZP CSI-RS configurations include ZP CSI-RS configurations for at least two different transmission points. In particular, the ZP CSI-RS configurations include a ZP CSI-RS configuration for discovery for one transmission point (e.g., a RRH) and one or more ZP CSI-RS configurations for another purpose (e.g., CSI feedback or interference measurement) for another transmission point(s).

The UE 10 then performs one or more actions for the subframe based on an assumption that all REs in a union of the REs identified, or defined, for the multiple ZP CSI-RS configurations are muted within the subframe (step 102). As used herein, a "muted" RE is an RE for which the transmitted power is intended to be zero. Note that due to hardware limitations, the actual power transmitted may be non-zero but some value that is substantially smaller than the power on REs transmitted with full power. In some embodiments, the action performed is reception of a data channel (e.g., from the macro cell base station) using rate matching around all REs in the union of the REs identified for the multiple ZP CSI-RS configurations (e.g., data reception assuming that all of these REs are muted). For LTE, the data channel is the PDSCH.

Figure 9:
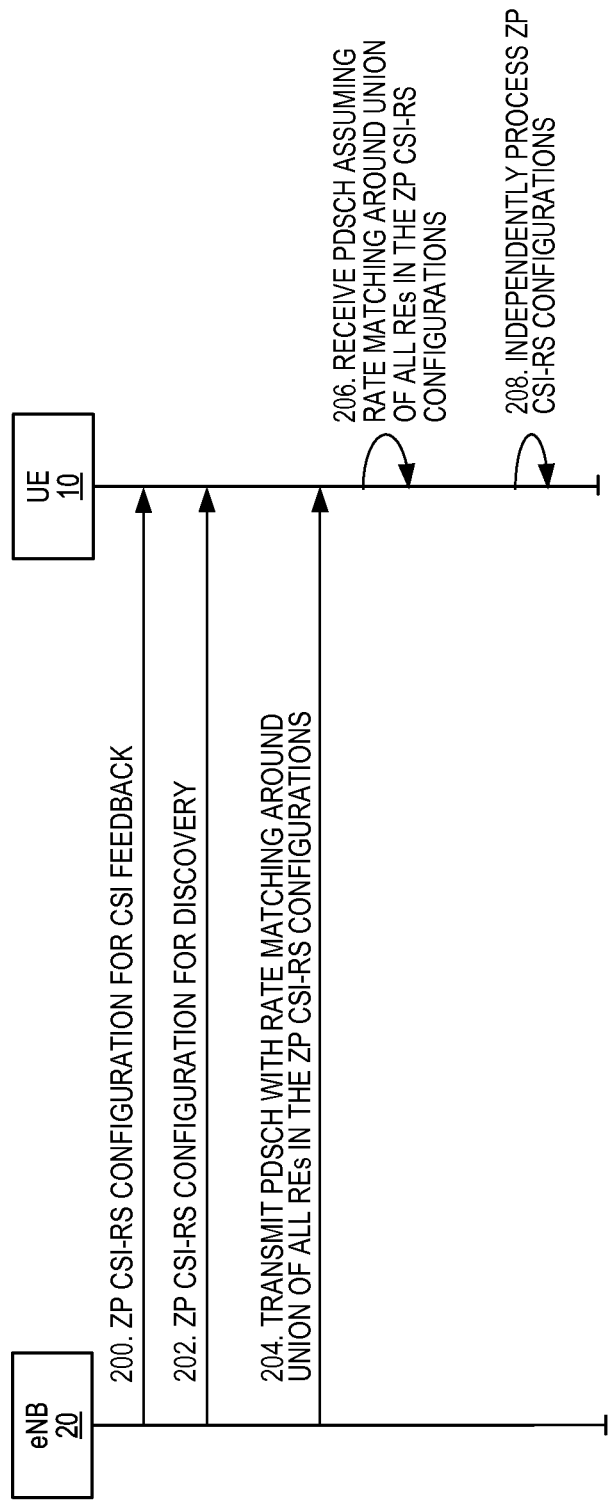
FIG. 9 illustrates the operation of an eNB and a UE with respect to a ZP CSI-RS configuration and one or more additional ZP CSI-RS configurations for the same subframe where the UE performs one or more actions based on an assumption that all REs in a set of REs defined by a union of REs in the ZP CSI-RS configurations are muted according to some embodiments of the present disclosure.

FIG. 9 illustrates the operation of both the UE 10 and the base station 20 (eNB) according to some embodiments of the present disclosure. As illustrated, the base station 20 transmits a ZP CSI-RS configuration to the UE 10 for CSI feedback (step 200). This ZP CSI-RS configuration for CSI feedback may be made in any suitable manner (e.g., semi-statically via RRC signaling or dynamically via a DCI message). The base station 20 also transmits a ZP CSI-RS configuration to the UE 10 for discovery of another transmission point(s), e.g., a RRH (step 202). Notably, here, the base station 20 is the serving base station of the UE 10 and, as such, the base station 20 sends both configurations to the UE 10. Further, this includes the situation where there are RRHs, which are considered to be part of the base station 20 (i.e., the configurations may be sent to the UE 10 from the base station 20 via a RRH). The ZP CSI-RS configuration for discovery of other transmission point(s) may be made in any suitable manner (e.g., semi-statically via RRC signaling or dynamically via a DCI message).

The base station 20 transmits data, which in this case is a PDSCH, with rate matching around all REs in a union of the REs identified, or defined, by both ZP CSI-RS configurations (step 204). Thus, for a particular subframe in which ZP CSI-RSs are configured for both CSI feedback and discovery, the base station 20 transmits data (i.e., the PDSCH in LTE) with rate matching around all REs in the union of the REs identified by both ZP CSI-RS configurations. The UE 10 receives the data, or PDSCH, assuming rate matching around all REs in the union of the REs identified by both ZP CSI-RS configurations (step 206). In addition, the UE 10 independently processes the REs identified by the ZP CSI-RS configurations according to their intended purposes, which in this case are CSI feedback (e.g., interference measurement) for the ZP CSI-RS configuration of step 200 and discovery for the ZP CSI-RS configuration of step 202 (step 208).

While FIGS. 8 and 9 focus on ZP CSI-RS configurations, CSI-RS configurations may also include NZP CSI-RS configurations. When the UE 10 is configured with multiple CSI-RS configurations, there may be subframes in NZP CSI-RS configurations for discovery of one transmit point and NZP CSI-RS configurations and for another purpose (e.g., CSI feedback) overlap. When this occurs, the UE 10 then uses the same NZP CSI-RS resources (i.e., the overlapping resources between the two overlapping NZP CSI-RS resources) for multiple purposes (e.g., both Radio Resource Management (RRM) measurements for discovery and CSI feedback).

Figure 10:
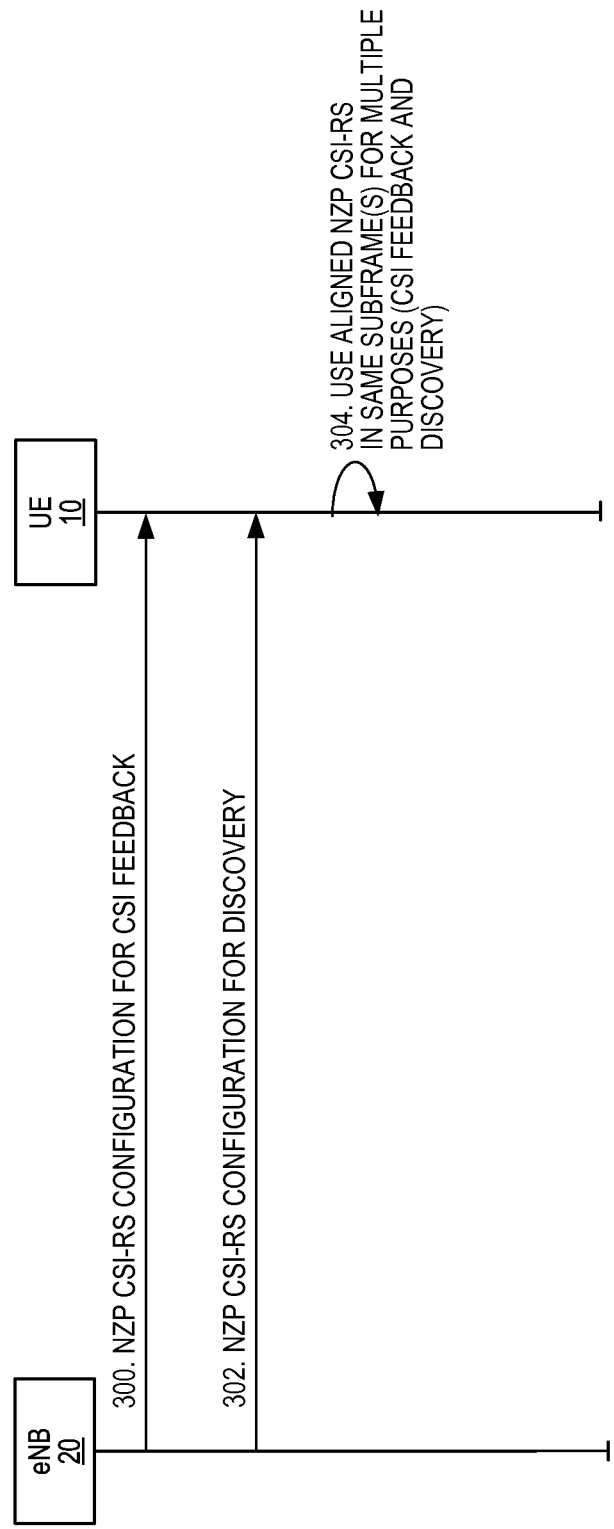
FIG. 10 illustrates the operation of an eNB and a UE with respect to aligned NZP CSI-RS configurations for different purposes in the same subframe according to some embodiments of the present disclosure.

In this regard, FIG. 10 illustrates the operation of the base station 20 (eNB) and the UE 10 where the UE 10 uses overlapping NZP CSI-RS resources between multiple CSI-RS configurations for different purposes according some embodiments of the present disclosure. As illustrated, the eNB 20 transmits a NZP CSI-RS configuration to the UE 10 for CSI feedback (step 300). This NZP CSI-RS configuration for CSI feedback may be made in any suitable manner (e.g., semi-statically via RRC signaling or dynamically via a DCI message). This NZP CSI-RS configuration for CSI feedback may be used to perform CSI-RS measurements on, e.g., the macro cell for CSI feedback. The eNB 20 also transmits a NZP CSI-RS configuration to the UE 10 for discovery of another transmission point(s), e.g., a RRH (step 302). As discussed above, in an implementation where there are RRHs, the RRHs are considered part of the eNB 20 such that the configurations of steps 300 and 302 may be transmitted via the RRHs. The NZP CSI-RS configuration for discovery of other transmission point(s) may be made in any suitable manner (e.g., semi-statically via RRC signaling or dynamically via a DCI message). The NZP CSI-RS configuration for discovery may be used to perform RRM measurements on, e.g., a RRH for discovery purposes. The UE 10 uses aligned, or overlapping, NZP CSI-RS resources in the same subframe(s) for multiple purposes (e.g., CSI feedback and discovery) (step 304). In other words, the REs in the two NZP CSI-RS configurations that are aligned, or overlap, are used for, in this example, both CSI feedback and discovery.

Figure 11:
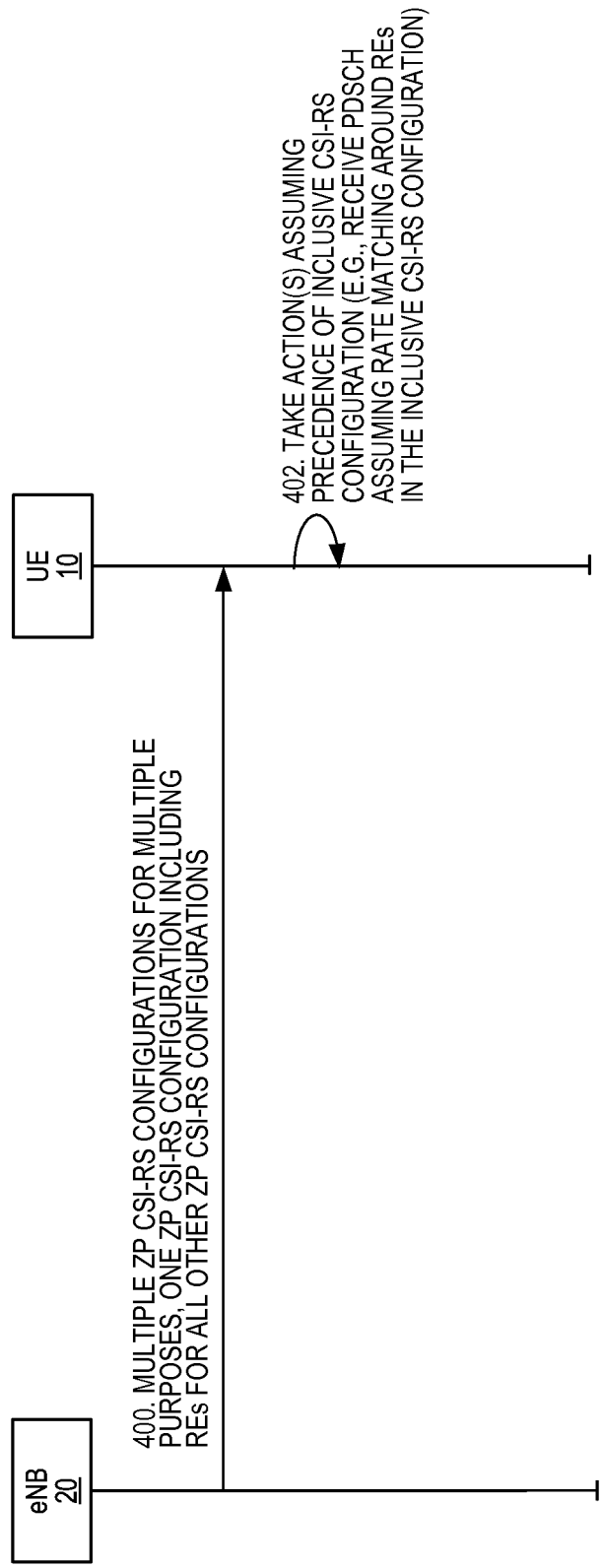
FIG. 11 illustrates the operation of an eNB and a UE with respect to a ZP CSI-RS configuration and one or more additional ZP CSI-RS configurations for the same subframe where one of the ZP CSI-RS configurations is controlled such that it includes all REs in all of the other ZP CSI-RS configurations and this one ZP CSI-RS configuration is given precedence by the UE when performing one or more actions according to some other embodiments of the present disclosure.

In the embodiments of FIGS. 8 and 9, the UE 10 operates based on the assumption that all REs in the union of the sets of REs identified by the multiple ZP CSI-RS configurations are muted. FIG. 11 illustrates an embodiment in which the base station 20 (eNB) ensures that the set of REs identified, or defined, by one of the multiple ZP CSI-RS configurations includes all of the REs in the other ZP CSI-RS configurations. The UE 10 then gives the inclusive ZP CSI-RS configuration precedence. In this manner, the UE 10 can perform data (e.g., PDSCH) reception with rate matching around all of the REs in the one ZP CSI-RS configuration having precedence. Since this one ZP CSI-RS configuration is inclusive of all REs in all of the other ZP CSI-RS configurations, rate matching is used around all of the REs in all of the ZP CSI-RS configurations.

More specifically, as illustrated in FIG. 11, the eNB 20 provides multiple ZP CSI-RS configurations to the UE 10 (step 400). The eNB 20 provides the ZP CSI-RS configurations such that one of the ZP CSI-RS configurations includes all of the REs in all of the other ZP CSI-RS configurations configured for the UE 10. The UE 10 then performs, or takes, one or more actions assuming precedence of the one ZP CSI-RS configuration that is inclusive of all of the REs in the other ZP CSI-RS configuration(s) (step 402). The ZP CSI-RS configuration that is to be given precedence may be explicitly signaled to the UE 10 or determined by the UE 10 based on one or more predefined rules. For example, in some embodiments, the UE 10 operates such that the ZP CSI-RS configuration for one purpose (e.g., CSI feedback or interference measurement) takes precedence over the ZP CSI-RS configuration(s) for other purposes (e.g., discovery). The action(s) taken by the UE 10 may include, for example, reception of data (e.g., PDSCH) with rate matching around all of the REs in the ZP CSI-RS configuration having precedence.

Figure 12:
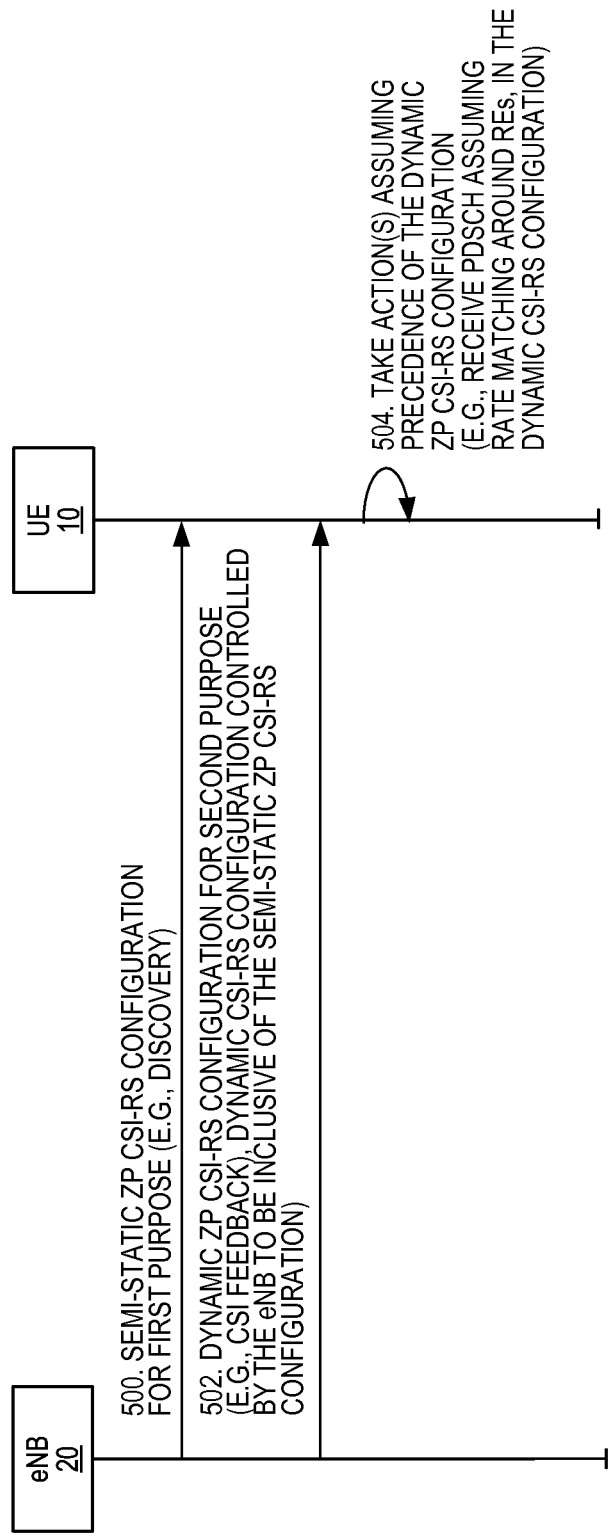
FIG. 12 illustrates the operation of an eNB and a UE with respect to a ZP CSI-RS configuration and one or more additional ZP CSI-RS configurations for the same subframe where a dynamically signaled ZP CSI-RS configuration is controlled such that it includes all REs in all of the other ZP CSI-RS configurations and this dynamically signaled ZP CSI-RS configuration is given precedence by the UE when performing one or more actions according to some other embodiments of the present disclosure.

FIG. 12 illustrates an embodiment that is similar to that of FIG. 11 but where the NZ CSI-RS configuration that is given precedence is the ZP CSI-RS configuration signaled to the UE 10 via dynamic signaling (e.g., a DCI message) as opposed to, for example, semi-static signaling (e.g., RRC signaling).

More specifically, as illustrated in FIG. 12, the base station 20 (eNB) transmits a ZP CSI-RS configuration to the UE 10 for a first purpose (e.g., discovery) via semi-static signaling (e.g., RRC signaling) (step 500). The eNB 20 also transmits a ZP CSI-RS configuration to the UE 10 for a second purpose (e.g., CSI feedback) via dynamic signaling (e.g., a DCI message) (step 502). As discussed above, the two ZP CSI-RS configurations are for different transmission points (e.g., an eNB serving a macro cell and a RRH within the macro cell). The eNB 20 controls the ZP CSI-RS configuration for the second purpose (i.e., the one sent via dynamic signaling) such that the set of REs identified for the ZP CSI-RS configuration for the second purpose includes all of the REs identified for the ZP CSI-RS configuration for the first purpose. In other words, the eNB 20 controls the ZP CSI-RS configuration sent via dynamic signaling such that the set of REs identified for this ZP CSI-RS configuration includes all REs of the other ZP CSI-RS configuration(s) for the other purpose(s). The UE 10 then performs, or takes, one or more actions assuming precedence of the ZP CSI-RS configuration sent via dynamic signaling (step 504). The action(s) taken by the UE 10 may include, for example, reception of data (e.g., PDSCH) with rate matching around all of the REs in the ZP CSI-RS configuration sent via dynamic signaling.

Figure 13:
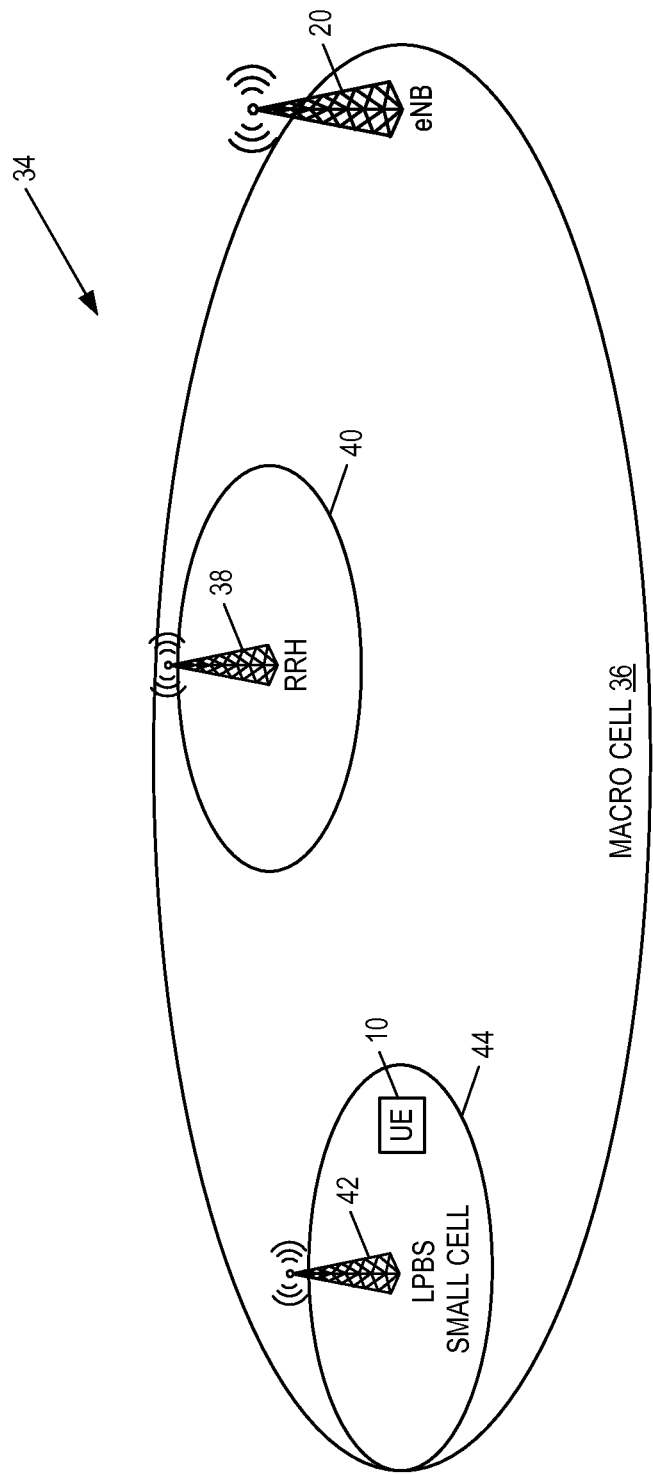
FIG. 13 illustrates one example of a cellular communications network in which a base station and a UE operating according to embodiments of the present disclosure may be implemented.

FIG. 13 illustrates one example of a cellular communications network 34 in which CSI-RSs are configured for different transmission points for different purposes (e.g., discovery and CSI feedback) according to some embodiments of the present disclosure. In this example, the cellular communications network 34 includes an eNB 20 serving a macro cell 36 as well as a RRH 38 having a corresponding coverage area or cell 40 and a low-power base station 42 (e.g., a home or femto eNB) serving a small cell 44. While only one RRH 38 and one low-power base station 42 are illustrated, the cellular communications network 34 may include any number of RRHs 38 and low-power base stations 42. Note, however, that the cellular communications network 34 is not required to have both the RRH(s) 38 and the low-power base station(s) 42. Further, other types of transmission points may be included (e.g., different transmission points for different sectors of the macro cell 36). UEs, such as the UE 10, are served by the eNB 20, the RRH 38, and the low-power base station 42 as appropriate. Notably, the eNB 20 and the UE 10 operate as described above.

The eNB 20, the RRH 38, and the low-power base station 42 preferably operate according to a shared cell scheme in which they all transmit the same PSS/SSS/CRS but different CSI-RS for, e.g., identification purposes. The RRH 38 and/or the low-power base station 42 may operate according to an on/off scheme where, for instance, the RRH 38 and/or the low-power base station 42 are turned off, potentially for long periods of time. Using the RRH 38 as an example, as discussed above, in order ensure that the RRH 38 is ready to deliver data to and receive data from UEs (e.g., the UE 10) in the coverage area 40 of the RRH 38 with minimal delay, the RRH 38 transmits discovery signals even when the RRH 38 is in the off state. As discussed above, the discovery signals are reference signals that are transmitted with much lower density in time than conventional reference signals.

The discovery signals support the properties required for enabling RRM measurements (e.g., received power and quality measurements (referred to as Reference Signal Received Power (RSRP) and Reference Signal Received Quality (RSRQ) measurements in LTE)) and time/frequency synchronization. The discovery signals are sent in a Discovery Reference Signal (DRS) occasion that can have a duration from 1 to 5 subframes for Frequency Division Duplexing (FDD) and 2 to 5 subframes for Time Division Duplexing (TDD). The DRS occasions can occur once every 40, 80, or 160 ms. The UE 10 is configured with a Discovery Measurement Timing Configuration (DMTC) for each carrier frequency on which RRM measurements for cells needs to be performed. The DMTC duration is 6 milliseconds (ms) and the timing of the DMTC is signaled to the UE 10 in reference to the current serving cell.

As discussed above, a ZP CSI-RS configuration for discovery and a ZP CSI-RS configuration(s) for other purpose(s) may be configured for the UE 10. When a particular subframe includes both resources for a ZP CSI-RS configuration for discovery as well as resources for a ZP CSI-RS configuration(s) for another purpose(s), the eNB 20 and/or the UE 10 takes steps to ensure that either: (a) the union of all REs in all of the ZP CSI-RS configurations in the subframe can be assumed to be muted or (b) one of the ZP CSI-RS configurations is given precedence and is controlled by the eNB 20 to be inclusive of all REs in the other ZP CSI-RS configuration(s) for that subframe. This allows rate matching during data reception (e.g., PDSCH reception) around all of the REs in all of the ZP CSI-RS configurations for the respective subframe. This avoids the need for the eNB 20 to use different CSI-RS configurations for the discovery signal subframes and for other subframes where CSI-RSs are configured for CSI feedback. For instance, the UE 10 does not have to store an additional ZP CSI-RS configuration for scheduling in discovery signal subframes, in its set of configurations that can be dynamically chosen from when in transmission mode 10.

Figure 14:
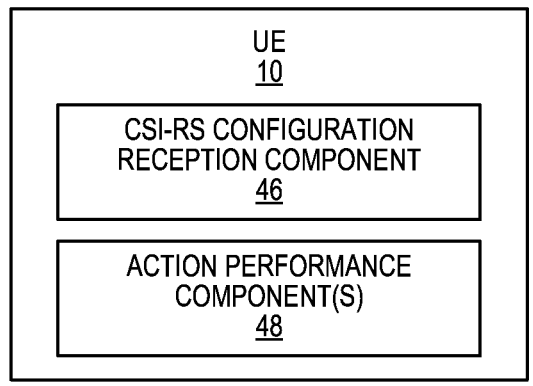
FIG. 14 is a block diagram of a UE according to some embodiments of the present disclosure.
Figure 15:
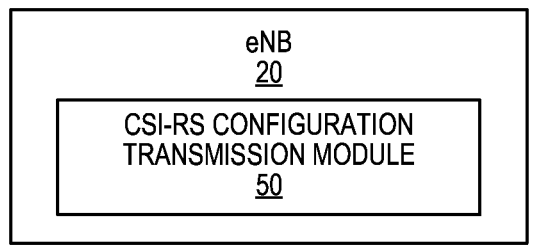
FIG. 15 is a block diagram of an eNB according to some embodiments of the present disclosure.

While FIGS. 5 and 6 are block diagrams of the UE 10 and the eNB 20, respectively according to some embodiments of the present disclosure, FIGS. 14 and 15 illustrate the UE 10 and the eNB 20, respectively, according to other embodiments of the present disclosure. As illustrated in FIG. 14, in some embodiments, the UE 10 includes a CSI-RS configuration reception component 46 and an action performance component(s) 48, each of which is implemented in software. The CSI-RS configuration reception component 46 operates to receive CSI-RS configurations (e.g., multiple ZP CSI-RS configurations) from the cellular communications network 34 via an associated receiver(s) of the UE 10 (not shown). The action performance component(s) 48 operate to perform one or more actions (e.g., data or PDSCH reception). As discussed above, in some embodiments, the action(s) are performed based on: (a) an assumption that all REs in the union of the sets of REs identified, or defined, by multiple ZP CSI-RS configurations for a particular subframe are muted or (b) a ZP CSI-RS configuration given or assumed to be given precedence.

In one embodiment, a computer program including instructions which, when executed by at least one processor, causes the at least one processor to carry out the functionality of the UE 10 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as memory).

As illustrated in FIG. 15, in some embodiments, the eNB 20 includes a CSI-RS configuration transmission module 50, which is implemented in software. The CSI-RS configuration transmission module 50 transmits (via an associated transmitter(s) of the eNB 20 which are not shown) multiple CSI-RS configurations (e.g., ZP CSI-RS configurations for different transmission points for different purposes such as, for instance, discovery and CSI feedback). In some embodiments, the CSI-RS configurations are separate configurations. In other embodiments, the eNB 20 controls the CSI-RS configurations such that one of multiple ZP CSI-RS configurations for the UE 10 is given precedence when transmitting data to the UE 10 in a subframe that includes REs included in the multiple ZP CSI-RS configurations. The ZP CSI-RS configuration is inclusive of all REs in the other ZP CSI-RS configurations such that, e.g., rate matching is provided around all of the REs in the inclusive ZP CSI-RS configuration.

In one embodiment, a computer program including instructions which, when executed by at least one processor, causes the at least one processor to carry out the functionality of the eNB 20 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as memory).

The following acronyms are used throughout this disclosure.

3GPP 3$^{rd}$ Generation Partnership Project
AP Antenna Port
ASIC Application Specific Integrated Circuit
CPU Central Processing Unit
CQI Channel Quality Indication
CRS Common Reference Signal
CSI-RS Channel State Information Reference Signal
D2D Device-to-Device
DAS Distributed Antenna System
DCI Downlink Control Information
DM-RS Demodulation Reference Symbol
DMTC Discovery Measurement Timing Configuration
DRS Discovery Reference Signal
DRX Discontinuous Reception
eNB Enhanced or Evolved Node B
E-SMLC Evolved Serving Mobile Location Centre
FDD Frequency Division Duplexing
FPGA Field Programmable Gate Array
GPS Global Positioning System
ID Identifier
LEE Laptop Embedded Equipment
LME Laptop Mounted Equipment
LTE Long Term Evolution
M2M Machine-to-Machine
MDT Minimization of Drive Tests
MME Mobility Management Entity
ms Millisecond
MSC Mobile Switching Centre
MSR Multi-Standard Radio
MTC Machine-Type Communication
NZP Non-Zero-Power
O&M Operation and Management
OFDM Orthogonal Frequency Division Multiplexing
OSS Operations and Support System
PDA Personal Digital Assistant
PDSCH Physical Downlink Shared Channel
PSS Primary Synchronization Signal
RAN Radio Access Network
RB Resource Block
RE Resource Element
RNC Radio Network Controller
RRC Radio Resource Control
RRH Remote Radio Head
RRM Radio Resource Management
RRU Remote Radio Unit
RS Reference Symbol
RSRP Reference Signal Received Power
RSRQ Reference Signal Received Quality
SON Self-Organizing Network
SSS Secondary Synchronization Signal
TDD Time Division Duplexing
UE User Equipment
USB Universal Serial Bus
UTRAN Universal Terrestrial Radio Access Network
WCDMA Wideband Code Division Multiple Access
ZP Zero-Power Those skilled in the art will recognize improvements and modifications to the embodiments of the present disclosure. All such improvements and modifications are considered within the scope of the concepts disclosed herein and the claims that follow.

What is claimed is:

1. A method of operation of a user equipment device in a cellular communications network, comprising:
    receiving multiple Zero-Power, ZP, Channel State Information Reference Signal, CSI-RS, configurations from the cellular communications network, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and
    performing one or more actions, comprising at least rate matching, based on an assumption that, within a subframe, the union of the first set of REs of the first ZP CSI-RS configuration and the second set of REs of the second set of ZP-RSI configuration are muted.

2. The method of claim 1 wherein performing the one or more actions comprises receiving data transmitted by a base station of the cellular communications network based on rate matching around the set of resource elements defined by the union of all resource elements in the multiple ZP CSI-RS configurations.

3. The method of claim 1 wherein performing the one or more actions comprises receiving a Physical Downlink Shared Channel, PDSCH, transmitted by a base station of the cellular communications network based on rate matching of the PDSCH around the set of resource elements defined by the union of all resource elements in the multiple ZP CSI-RS configurations.

4. The method of claim 1 further comprising:
    receiving a Non-Zero Power, NZP, CSI-RS configuration that overlaps at least one of the multiple ZP CSI-RS configurations; and
    using resource elements in the NZP CSI-RS configuration for an intended purpose of the NZP CSI-RS configuration;
    wherein performing the one or more actions comprises receiving a Physical Downlink Shared Channel, PDSCH, transmitted by a base station of the cellular communications network based on rate matching of the PDSCH around the set of resource elements defined by the union of all resource elements in the multiple ZP CSI-RS configurations including one or more of the resource elements in the NZP CSI-RS configuration that overlap with the at least one of the multiple ZP CSI-RS configurations.

5. The method of claim 4 wherein the intended purpose of the NZP CSI-RS configuration is CSI feedback.

6. The method of claim 1 wherein the purpose other than small-cell or transmission point discovery is CSI feedback.

7. The method of claim 1 wherein the purpose other than small-cell or transmission point discovery is interference measurement.

8. The method of claim 1 further comprising separately using each ZP CSI-RS configuration of the multiple ZP CSI-RS configurations for an intended purpose of the ZP CSI-RS configuration.

9. A user equipment device enabled to operate in a cellular communications network, comprising:
   a transceiver module;
   a processing module; and
   memory containing software instructions executable by the processing module whereby the user equipment device is operative to:
   receive multiple Zero-Power, ZP, Channel State Information Reference Signal, CSI-RS, configurations from the cellular communications network, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and
   perform one or more actions, comprising at least rate matching, based on an assumption that, within a subframe, the union of the first set of REs of the first ZP CSI-RS configuration and the second set of REs of the second set of ZP-RSI configuration.

10. The user equipment device of claim 9 wherein the one or more actions comprise receiving data transmitted by a base station of the cellular communications network based on rate matching around the set of resource elements defined by the union of all resource elements in the multiple ZP CSI-RS configurations.

11. The user equipment device of claim 9 wherein the one or more actions comprise receiving a Physical Downlink Shared Channel, PDSCH, transmitted by a base station of the cellular communications network based on rate matching of the PDSCH around the set of resource elements defined by the union of all resource elements in the multiple ZP CSI-RS configurations.

12. The user equipment device of claim 9 wherein, via execution of the software instructions, the user equipment device is further operative to:
   receive, via the transceiver module, a Non-Zero Power, NZP, CSI-RS configuration that overlaps at least one of the multiple ZP CSI-RS configurations; and
   use resource elements in the NZP CSI-RS configuration for an intended purpose of the NZP CSI-RS configuration;
   wherein the one or more actions comprise receiving a Physical Downlink Shared Channel, PDSCH, transmitted by a base station of the cellular communications network based on rate matching of the PDSCH around the set of resource elements defined by the union of all resource elements in the multiple ZP CSI-RS configurations including one or more of the resource elements in the NZP CSI-RS configuration that overlap with the at least one of the multiple ZP CSI-RS configurations.

13. The user equipment device of claim 12 wherein the intended purpose of the NZP CSI-RS configuration is CSI feedback.

14. The user equipment device of claim 9 wherein the purpose other than small-cell or transmission point discovery is CSI feedback.

15. The user equipment device of claim 9 wherein the purpose other than small-cell or transmission point discovery is interference measurement.

16. The user equipment device of claim 9 wherein, via execution of the software instructions, the user equipment device is further operative to separately use each ZP CSI-RS configuration of the multiple ZP CSI-RS configurations for an intended purpose of the ZP CSI-RS configuration.

17. A method of operation of a base station of a cellular communications network, comprising:
   transmitting multiple Zero-Power, ZP, Channel State Information Reference Signal, CSI-RS, configurations to a user equipment device, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and
   transmitting, in a subframe, data to the user equipment device based on rate matching around a union of the first set of REs of the first ZP CSI-RS configuration and a second set of REs of the second ZP CSI-RS configuration.

18. The method of claim 17 wherein transmitting the data comprises transmitting a Physical Downlink Shared Channel, PDSCH, to the user equipment device in a subframe based on rate matching of the PDSCH around the set of resource elements defined by the union of all resource elements in the multiple ZP CSI-RS configurations.

19. The method of claim 17 further comprising:
   transmitting a Non-Zero Power, NZP, CSI-RS configuration to the user equipment device that overlaps at least one of the multiple ZP CSI-RS configurations;
   wherein transmitting the data comprises transmitting a Physical Downlink Shared Channel, PDSCH, to the user equipment device in a subframe based on rate matching of the PDSCH around the set of resource elements defined by the union of all resource elements in the multiple ZP CSI-RS configurations including one or more of the resource elements in the NZP CSI-RS configuration that overlap with the at least one of the multiple ZP CSI-RS configurations.

20. The method of claim 19 wherein the intended purpose of the NZP CSI-RS configuration is CSI feedback.

21. The method of claim 17 wherein the purpose other than small-cell or transmission point discovery is CSI feedback.

22. The method of claim 17 wherein the purpose other than small-cell or transmission point discovery is interference measurement.

23. A base station of a cellular communications network, comprising:
   a transceiver module;
   a processing module; and memory containing software instructions executable by the processing module whereby a user equipment device is operative to:

transmit, via the transceiver module, multiple Zero-Power, ZP, Channel State Information Reference Signal, CSI-RS, configurations to the user equipment device, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and transmit, in a subframe, data to the user equipment device based on rate matching around a union of the first set of resource elements (REs) of the first ZP CSI-RS configuration and a second set of REs of the second ZP CSI-RS configuration.

24. The base station of claim 23 wherein, in order to transmit the data, the user equipment device is further operative to transmit a Physical Downlink Shared Channel, PDSCH, to the user equipment device in a subframe based on rate matching of the PDSCH around the set of resource elements defined by the union of all resource elements in the multiple ZP CSI-RS configurations.

25. The base station of claim 23 wherein, via the software instructions, the base station is further operative to:

transmit a Non-Zero Power, NZP, CSI-RS configuration to the user equipment device that overlaps at least one of the multiple ZP CSI-RS configurations;

wherein, in order to transmit the data, the user equipment device is further operative to transmit a Physical Downlink Shared Channel, PDSCH, to the user equipment device in a subframe based on rate matching of the PDSCH around the set of resource elements defined by the union of all resource elements in the multiple ZP CSI-RS configurations including one or more of the resource elements in the NZP CSI-RS configuration that overlap with the at least one of the multiple ZP CSI-RS configurations.

26. The base station of claim 25 wherein the intended purpose of the NZP CSI-RS configuration is CSI feedback.

27. The base station of claim 23 wherein the purpose other than small-cell or transmission point discovery is CSI feedback.

28. The base station of claim 23 wherein the purpose other than small-cell or transmission point discovery is interference measurement.

29. A method of operation of a user equipment device in a cellular communications network, comprising:

receiving multiple Zero-Power, ZP, Channel State Information Reference Signal, CSI-RS, configurations from the cellular communications network, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and performing one or more actions, comprising at least rate matching, based on an assumption that, within a subframe, a set of resource elements in one of the multiple ZP CSI-RS configurations are muted, the set of resource elements in the one of the multiple ZP CSI-RS configurations being inclusive of all resource elements in the other ZP CSI-RS configurations.

30. The method of claim 29 wherein performing the one or more actions comprises receiving a Physical Downlink Shared Channel, PDSCH, transmitted by a base station of the cellular communications network based on rate matching of the PDSCH around the set of resource elements in the one of the multiple ZP CSI-RS configurations.

31. The method of claim 29 wherein:

receiving the multiple ZP CSI-RS configurations comprises receiving the one of the multiple CSI-RS configurations via dynamic signaling and receiving another one of the multiple CSI-RS configurations via semi-static signaling; and performing the one or more actions comprises performing the one or more actions based on an assumption that the one of the multiple ZP CSI-RS configurations received via dynamic signaling takes precedence over the other ZP CSI-RS configurations such that the set of resource elements in the one of the multiple ZP CSI-RS configurations are muted and are inclusive of all resource elements in the other ZP CSI-RS configurations.

32. The method of claim 31 wherein performing the one or more actions comprises receiving a Physical Downlink Shared Channel, PDSCH, transmitted by a base station of the cellular communications network based on rate matching of the PDSCH around the set of resource elements in the one of the multiple ZP CSI-RS configurations.

33. A user equipment device enabled to operate in a cellular communications network, comprising:

a transceiver module;

a processing module; and memory containing software instructions executable by the processing module whereby the user equipment device is operative to:

receive, via the transceiver module, multiple Zero-Power, ZP, Channel State Information Reference Signal, CSI-RS, configurations from the cellular communications network, the multiple ZP CSI-RS configurations comprising a first set of resource elements (REs) of a first ZP CSI-RS configuration and a second set of REs of a second ZP CSI-RS configuration, wherein the first ZP CSI-RS configuration is for a first purpose of either a small-cell discovery or a transmission point discovery, and wherein the second ZP CSI-RS configuration is for a second purpose, different from the first purpose; and perform one or more actions, comprising at least rate matching, based on an assumption that, within a subframe, a set of resource elements in one of the multiple ZP CSI-RS configurations are muted, the set of resource elements in the first ZP CSI-RS configuration of the multiple ZP CSI-RS configurations being inclusive of all resource elements in the second ZP CSI-RS configuration of the multiple ZP CSI-RS configurations.

34. The user equipment device of claim 33 wherein the one or more actions comprise receiving a Physical Downlink Shared Channel, PDSCH, transmitted by a base station of the cellular communications network based on rate matching of the PDSCH around the set of resource elements in the one of the multiple ZP CSI-RS configurations.

35. The user equipment device of claim 33 wherein:

the one of the multiple CSI-RS configurations is received via dynamic signaling and another one of the multiple CSI-RS configurations is received via semi-static signaling; and the one or more actions are performed based on an assumption that the one of the multiple ZP CSI-RS configurations received via dynamic signaling takes precedence over the other ZP CSI-RS configurations such that the set of resource elements in the one of the multiple ZP CSI-RS configurations are muted and are inclusive of all resource elements in the other ZP CSI-RS configurations.

36. The user equipment device of claim 35 wherein the one or more actions comprise receiving a Physical Downlink Shared Channel, PDSCH, transmitted by a base station of the cellular communications network based on rate matching of the PDSCH around the set of resource elements in the one of the multiple ZP CSI-RS configurations.

37. A method of operation of a base station of a cellular communications network, comprising:
transmitting multiple Zero-Power, ZP, Channel State Information Reference Signal, CSI-RS, configurations to a user equipment device such that a set of resource elements in a first ZP CSI-RS configuration of the multiple ZP CSI-RS configurations is inclusive of all resource elements in a second ZP CSI-RS configuration of the multiple ZP CSI-RS configurations, wherein the first ZP CSI-RS configuration is different from the second ZP CSI-RS configuration, and wherein the first ZP CSI-RS configuration is for a first purpose of either small-cell discovery or transmission point discovery and the second ZP CSI-RS configuration is for a second purpose, different from the first purpose; and
transmitting, within a subframe, data to the user equipment device based on rate matching around the set of resource elements in a first ZP CSI-RS configuration of the multiple ZP CSI-RS configurations that is inclusive of all resource elements in a second ZP CSI-RS configuration of the multiple ZP CSI-RS configurations.

38. The method of claim 37 wherein transmitting the data comprises transmitting, within the subframe, a Physical Downlink Shared Channel, PDSCH, based on rate matching of the PDSCH around the set of resource elements in the one of the multiple ZP CSI-RS configurations.

39. The method of claim 37 wherein:
transmitting the multiple ZP CSI-RS configurations comprises transmitting the one of the multiple CSI-RS configurations via dynamic signaling and transmitting another one of the multiple CSI-RS configurations via semi-static signaling.

40. The method of claim 39 wherein the one of the multiple ZP CSI-RS configurations received via dynamic signaling takes precedence over the other one of the multiple ZP CSI-RS configurations such that the set of resource elements in the one of the multiple ZP CSI-RS configurations are muted and are inclusive of all resource elements in the other ZP CSI-RS configurations.

41. The method of claim 40 wherein transmitting the data comprises transmitting, within the subframe, a Physical Downlink Shared Channel, PDSCH, based on rate matching of the PDSCH around the set of resource elements in the one of the multiple ZP CSI-RS configurations.

42. A method of operation of a user equipment device comprising:
receiving a first Non-Zero Power, NZP, Channel State Information Reference Signal, CSI-RS, configuration used for CSI feedback and a second NZP CSI-RS configuration used for a discovery of another transmission point (TP), the first NZP CSI-RS configuration and the second NZP CSI-RS configurations comprising an aligned resource element that is comprised in both a first set of resource elements (REs) of the first NZP CSI-RS configuration and the second set of REs of the second NZP CSI-RS configuration; and
using the aligned resource element for both the first and second purposes.

43. A method of operation of a base station comprising:
transmitting, to a user equipment device, a first Non-Zero Power, NZP, Channel State Information Reference Signal, CSI-RS, configuration used for CSI feedback and a second NZP CSI-RS configuration used for a discovery of another transmission point (TP), the first NZP CSI-RS configuration and the second NZP CSI-RS configurations comprising an aligned resource element that is comprised in both a first set of resource elements (REs) of the first NZP CSI-RS configuration and the second set of REs of the second NZP CSI-RS configurations.

* * * * *

UNITED STATES PATENT AND TRADEMARK OFFICE
CERTIFICATE OF CORRECTION

PATENT NO.        : 9,935,807 B2
APPLICATION NO.   : 14/660478
DATED             : April 3, 2018
INVENTOR(S)       : Koorapaty et al.

Page 1 of 1

It is certified that error appears in the above-identified patent and that said Letters Patent is hereby corrected as shown below:

In the Specification

In Column 14, Line 63, delete "NZ CSI-RS" and insert -- NZP CSI-RS --, therefor.

In the Claims

In Column 18, Line 40, in Claim 1, delete "ZP-RSI" and insert -- ZP CSI-RS --, therefor.

In Column 19, Line 38, in Claim 9, delete "ZP-RSI configuration." and insert -- ZP CSI-RS configuration are muted. --, therefor.

In Column 24, Line 24, in Claim 42, delete "configurations" and insert -- configuration --, therefor.

In Column 24, Line 38, in Claim 43, delete "configurations" and insert -- configuration --, therefor.

In Column 24, Lines 41-42, in Claim 43, delete "configurations." and insert -- configuration. --, therefor.

Signed and Sealed this
Seventeenth Day of July, 2018

Andrei Iancu
*Director of the United States Patent and Trademark Office*